US007099767B2

(12) United States Patent
Muto et al.

(10) Patent No.: US 7,099,767 B2

(45) Date of Patent: Aug. 29, 2006

(54) CONTROL DEVICE FOR INTERNAL COMBUSTION ENGINE

(75) Inventors: Harufumi Muto, Aichi-ken (JP); Satoshi Furukawa, Kariya (JP); Naoki Maeda, Anjo (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/255,888

(22) Filed: Oct. 24, 2005

(65) Prior Publication Data

US 2006/0089780 A1 Apr. 27, 2006

(30) Foreign Application Priority Data

Oct. 27, 2004 (JP) ............................ 2004-312614

(51) Int. Cl.
*F02D 45/00* (2006.01)
*F02D 43/00* (2006.01)
*G01F 17/00* (2006.01)

(52) U.S. Cl. ................. 701/102; 73/118.2; 73/204.18; 123/361

(58) Field of Classification Search ................ 701/102, 701/103, 114, 115, 101; 73/117.3, 118.2, 73/204.18; 123/399, 361
See application file for complete search history.

(56) References Cited

U.S. PATENT DOCUMENTS 4,705,001 A * 11/1987 Danno et al. ............... 123/361
5,301,126 A * 4/1994 Nishimura et al. ........ 73/118.2
6,644,104 B1 11/2003 Muto et al. ................ 73/118.2

FOREIGN PATENT DOCUMENTS

JP A-2000-320391 11/2000
JP A-2002-097994 4/2002

* cited by examiner

*Primary Examiner*—Hieu T. Vo
(74) *Attorney, Agent, or Firm*—Oliff & Berridge, PLC

(57) ABSTRACT

An intake passage upstream of a throttle valve is divided into a plurality of intake divided-flow conduits, and air flow meters are arranged in the respective intake divided-flow conduits. The throttle opening is obtained, and a throttle valve passing-through air amount, which is an amount of air passing through the throttle valve, is calculated on the basis of the throttle opening. Each air flow meter-detecting intake air amount, which is an intake air amount to be detected by the air flow meter, assuming that air flows through each intake divided-flow conduit by a part of the throttle valve passing-through air amount, the part being determined by a divided-flow ratio of the corresponding intake divided-flow conduit, is estimated, and a total value of the estimated air flow meter-detecting intake air amounts is then estimated. The engine is controlled on the basis of the total air flow meter-detecting intake air amount.

22 Claims, 18 Drawing Sheets

CONTROL DEVICE FOR INTERNAL COMBUSTION ENGINE

BACKGROUND OF THE INVENTION

1. Field of the Invention

The present invention relates to a control device for an internal combustion engine.

2. Related Art

In order to make an air-fuel ratio accurately equal to a target air-fuel ratio, it is necessary to accurately obtain an in-cylinder intake air amount, which is an amount of intake air sucked into a cylinder and, in particular, the in-cylinder intake air amount at a closing timing of an intake valve. There is known an internal combustion engine in which the in-cylinder intake air amount at the closing timing of the intake valve is estimated by using a calculation model modeling an intake pipe which is an intake passage downstream of a throttle valve.

Use of such a calculation model will simplify the calculation. However, calculation results typically include calculation errors which should be eliminated.

Therefore, if an amount of air passing through an air flow meter is referred to as a throttle valve passing-through air amount and an air amount to be detected by the air flow meter is referred to as an air flow meter-detecting air amount, there is known an internal combustion engine in which: an air flow meter is provided for detecting an amount of air flowing through an intake passage of the engine; an in-cylinder intake air amount at the closing timing of the intake valve is estimated; a current throttle valve passing-through air amount is calculated on the basis of a current throttle opening; a current in-cylinder intake air amount is calculated from the current throttle valve passing-through air amount and the above-mentioned calculation model; an air flow meter-detecting air amount assuming that air flows through the intake passage by the calculated current in-cylinder intake air amount is estimated; the current in-cylinder intake air amount is estimated from the estimated air flow meter-detecting air amount and the above-mentioned calculation model; the estimated in-cylinder intake air amount at the closing timing of the intake valve is corrected by a difference between the calculated current in-cylinder intake air amount and the estimated current in-cylinder intake air amount, to calculate the final in-cylinder intake air amount at the closing timing of the intake valve; and the engine is controlled using the thus calculated, final in-cylinder intake air amount at the closing timing of the intake valve (see U.S. Pat. No. 6,644,104).

The difference between the calculated current in-cylinder intake air amount and the estimated current in-cylinder intake air amount represents errors of the calculation model. Therefore, the estimated in-cylinder intake air amount at the closing timing of the intake valve corrected by the difference will represent the in-cylinder intake air amount at the closing timing of the intake valve accurately.

On the other hand, if clogging occurs at, for example, an air cleaner arranged in the intake passage upstream of the throttle valve, an amount of air supplied to the engine may be insufficient. Therefore, it has been proposed that the intake passage upstream of the throttle valve is divided into a plurality of intake divided-flow conduits and air cleaners are arranged in the respective intake divided-flow conduits. In this proposal, amounts of air flowing through the respective intake divided-flow conduits are not always identical. Therefore, it is preferable to arrange air flow meters in the respective intake divided-flow conduits in order to obtain the in-cylinder intake air amount accurately.

However, USP'104 discloses only a method of calculating the in-cylinder intake air amount when a single air flow meter is provided. A method of calculating the in-cylinder intake air amount when a plurality of the air flow meters are provided must be newly introduced.

SUMMARY OF THE INVENTION

An object of the present invention is to provide a control device for an internal combustion engine having a plurality of intake divided-flow conduits, capable of accurately obtaining the in-cylinder intake air amount at the closing timing of the intake valve, and of accurately conducting the engine control.

According to a first aspect of the present invention, there is provided a control device for an internal combustion engine having an intake passage and a throttle valve arranged in the intake passage, the intake passage upstream of the throttle valve being divided into a plurality of intake divided-flow conduits, the control device comprising: air flow meters arranged in the respective intake divided-flow conduits; obtaining means for obtaining the throttle opening; calculation means for calculating a throttle valve passing-through air amount, which is an amount of air passing through the throttle valve, on the basis of the throttle opening obtained by the obtaining means; estimating means for estimating each air flow meter-detecting intake air amount, which is an intake air amount to be detected by each air flow meter, assuming that air flows through each intake divided-flow conduit by a part of the throttle valve passing-through air amount calculated by the calculation means, the part being determined by a divided-flow ratio of the corresponding intake divided-flow conduit, and for estimating a total value of the estimated air flow meter-detecting intake air amounts; and control means for controlling the engine on the basis of the total air flow meter-detecting intake air amount estimated by the estimating means.

According to a second aspect of the present invention, there is provided a control device for an internal combustion engine having an intake passage and a throttle valve arranged in the intake passage, the intake passage upstream of the throttle valve being divided into a plurality of intake divided-flow conduits, the control device comprising: air flow meters arranged in the respective intake divided-flow conduits; obtaining means for obtaining the throttle opening; calculation means for calculating a throttle valve passing-through air amount, which is an amount of air passing through the throttle valve, on the basis of the throttle opening obtained by the obtaining means; estimating means for estimating each air flow meter-detecting intake air amount, which is an intake air amount to be detected by the air flow meter, assuming that air, of which amount is equal to the throttle valve passing-through air amount calculated by the calculation means, flows through the intake divided-flow conduits substantially uniformly, and for estimating a total value of the estimated air flow meter-detecting intake air amounts; and control means for controlling the engine on the basis of the total air flow meter-detecting intake air amount estimated by the estimating means.

According to a third aspect of the present invention, there is provided a control device for an internal combustion engine having an intake passage and a throttle valve arranged in the intake passage, the intake passage upstream of the throttle valve being divided into a plurality of intake divided-flow conduits, the control device comprising: air flow meters arranged in the respective intake divided-flow conduits; obtaining means for obtaining the throttle opening; calculation means for calculating a throttle valve passing-through air amount, which is an amount of air passing through the throttle valve, on the basis of the throttle opening obtained by the obtaining means; judging means for judging whether the air flow meters have malfunctioned; estimating means for estimating each air flow meter-detecting intake air amount, which is an intake air amount to be detected by the air flow meter, assuming that air, of which amount is equal to the throttle valve passing-through air amount calculated by the calculation means, flows through the intake divided-flow conduits substantially uniformly, and for estimating a total value of the estimated air flow meter-detecting intake air amounts, when it is judged that a part of the air flow meters have malfunctioned; and control means for controlling the engine on the basis of the total air flow meter-detecting intake air amount estimated by the estimating means.

According to a fourth aspect of the present invention, there is provided a control device for an internal combustion engine having an intake passage and a throttle valve arranged in the intake passage, the intake passage upstream of the throttle valve being divided into a plurality of intake divided-flow conduits, the control device comprising: air flow meters arranged in the respective intake divided-flow conduits; estimating means for estimating an amount of air flowing through each intake divided-flow conduit on the basis of a corresponding air flow meter-detecting intake air amount which is an intake air amount to be detected by the air flow meter, and for estimating a throttle valve passing-through air amount, which is an amount of air passing through the throttle valve, from a total value of the estimated amounts of air flowing through the intake divided-flow conduits; and control means for controlling the engine on the basis of the throttle valve passing-through air amount estimated by the estimating means.

The present invention may be more fully understood from the description of the preferred embodiments according to the invention as set forth below, together with the accompanying drawings.

DESCRIPTION OF THE PREFERRED EMBODIMENTS

Figure 1:
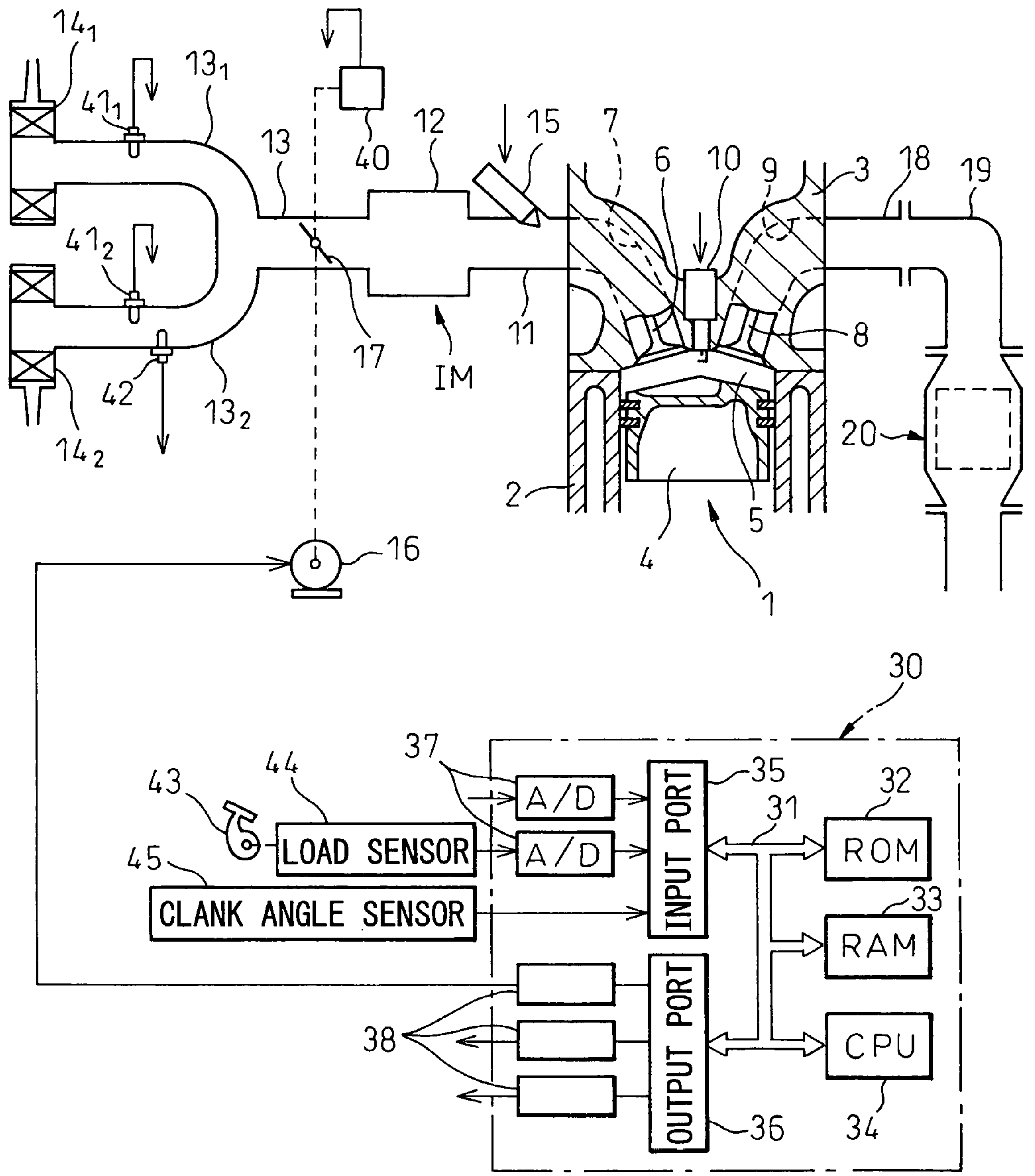
FIG. 1 shows an overall view of an internal combustion engine.

FIG. 1 shows a case in which the present invention is applied to an internal combustion engine of a spark ignition type. Alternatively, the present invention may also be applied to an internal combustion engine of a compression ignition type.

Referring to FIG. 1, the reference numeral 1 designates an engine body having four cylinders, for example, 2 designates a cylinder block, 3 designates a cylinder head, 4 designates a piston, 5 designates a combustion chamber, 6 designates intake valves, 7 designates intake ports, 8 designates exhaust valves, 9 designates exhaust ports and 10 designates a spark plug. The intake ports 7 are connected to a surge tank 12 through corresponding intake branches 11, and the surge tank 12 is connected to a plurality of intake divided-flow pipes through an intake duct 13. In the example shown in FIG. 1, there are two intake divided-flow pipes $\mathbf{13}_1$, $\mathbf{13}_2$. An air cleaner $\mathbf{14}_1$, $\mathbf{14}_2$ is arranged in each intake divided-flow pipes $\mathbf{13}_1$, $\mathbf{13}_2$. A fuel injector 15 is arranged in each intake branch 11, and a throttle valve 17 driven by a step motor 16 is arranged in the intake duct 13. In this way, the intake duct 13 upstream of the throttle valve 17 is divided into a plurality of the intake divided-flow pipes $\mathbf{13}_1$, $\mathbf{13}_2$. Note that the intake duct 13 downstream of the throttle valve 17, the surge tank 12, the intake branches 11, and the intake ports 7 are referred to as an intake pipe IM, in the present specification.

On the other hand, the exhaust ports 9 are connected via an exhaust manifold 18 and an exhaust pipe 19 to a catalytic converter 20, and the catalytic converter 20 is communicated to the outside air via a muffler (not shown).

An electronic control unit 30 is constituted of a digital computer including a ROM (read-only memory) 32, a RAM (random access memory) 33, a CPU (microprocessor) 34, an input port 35 and an output port 36, which are connected to each other through a bidirectional bus 31. A throttle opening sensor 40 is attached to the throttle valve 17 for detecting an opening of the throttle valve 17, i.e., a throttle opening θt. An air flow meter $\mathbf{41}_1$, $\mathbf{41}_2$ is attached to each intake divided-flow pipe $\mathbf{13}_1$, $\mathbf{13}_2$ for detecting a flow rate of intake air flowing through the corresponding intake divided-flow pipe $\mathbf{13}_1$, $\mathbf{13}_2$. Each air flow meter $\mathbf{41}_1$, $\mathbf{41}_2$ has a built-in atmospheric temperature sensor for detecting the atmospheric temperature Ta (K). An atmospheric pressure sensor 42 for detecting the atmospheric pressure Pa (kPa) is attached to, for example, the intake divided-flow pipe $\mathbf{13}_2$. Also, an accelerator pedal 43 is connected with a load sensor 44 for detecting a depression ACC of the accelerator pedal 43. The depression ACC of the accelerator pedal 43 represents a required load. The output voltages of the sensors 40, $\mathbf{41}_1$, $\mathbf{41}_2$, 42 and 44 are input through the corresponding A/D converter 37 to the input port 35. Further, the input port 35 is connected with a crank angle sensor 45 for generating an output pulse for each rotation of 30°, for example, of the crankshaft. CPU 34 calculates the engine speed NE on the basis of the output pulse from the crank angle sensor 45. On the other hand, the output port 36 is connected through corresponding drive circuits 38 to the spark plug 10, the fuel injectors 15, and the step motor 16, which are controlled on the basis of the output signals from the electronic control unit 30. Note that a flow rate of intake air to be detected by the air flow meter $\mathbf{41}_j$ (j=1, 2) is referred to as an air flow meter-detecting air flow rate $mtafm_j$ (gram/sec), hereinafter.

Air portions pass through the intake divided-flow pipes $\mathbf{13}_1$, $\mathbf{13}_2$, respectively, and then merge with each other in the intake duct 13. If a ratio of an amount of air flowing through each intake divided-flow pipe $\mathbf{13}_1$, $\mathbf{13}_2$ with respect to a total amount of the intake air, is referred to as a divided-flow ratio $r_1$, $r_2$ ($r_j>0$, $\Sigma r_j=1$; j=1, 2), the divided-flow ratios $r_1$, $r_2$ of the intake divided-flow pipes $\mathbf{13}_1$, $\mathbf{13}_2$ are determined in advance, in the engine shown in FIG. 1.

In the internal combustion engine shown in FIG. 1, a fuel injection amount QF is calculated on the basis of the following equation (1), for example:

$$QF=kAF\cdot KL \tag{1}$$

where kAF represents a coefficient for setting an air-fuel ratio, and KL represents an engine load ratio (%).

The coefficient for setting an air-fuel ratio kAF is a coefficient representing a target air-fuel ratio. The coefficient kAF becomes larger when the target air-fuel ratio is made larger or leaner, and becomes smaller when the target air-fuel ratio is made smaller or richer. The coefficient kAF is stored in the ROM 32 in advance as a function of the engine operating condition such as the required engine load and the engine speed.

On the other hand, the engine load ratio KL represents an amount of air charged in each cylinder, and is defined by the following equation (2), for example:

$$KL=\frac{Mc}{\dfrac{DSP}{NCYL}\cdot \rho astd}\cdot 100 \tag{2}$$

where Mc represents an in-cylinder charged air amount (gram) which is an amount of air having been charged into each cylinder when the intake stroke is completed; DSP represents the displacement of the engine (liter); NCYL represents the number of cylinders; and ρastd represents density of air (=approximately 1.2 g/liter) at standard conditions (1 atm and 25° C.). By replacing these coefficients together with kk, the in-cylinder charged air amount Mc can be expressed by the following equation (3):

$$Mc=\frac{KL}{kk} \tag{3}$$

Further, if a flow rate of air sucked from the intake pipe IM into the cylinder is referred to as an in-cylinder intake air flow rate mc (gram/sec) and the in-cylinder intake air flow rate mc at the closing timing of the intake valve is referred to as a closing-timing in-cylinder intake air flow rate mcfwd (gram/sec), the in-cylinder charged air amount Mc can also be expressed by the following equation (4):

$$Mc=mcfwd\cdot tiv \tag{4}$$

where tiv represent a time period (sec) required for each cylinder to conduct one intake stroke.

Therefore, in order to make an air-fuel ratio equal to a target air-fuel ratio accurately, it is necessary to accurately obtain any one of the engine load ratio KL, the in-cylinder charged air amount Mc and the closing-timing in-cylinder intake air flow rate mcfwd. In the following description, a case in that the closing-timing in-cylinder intake air flow rate mcfwd is obtained will be explained. Note that, considering that the closing timing of the intake valve comes after a certain time tfwd from the current or calculation timing, it can be said that the embodiment of present invention predicts the in-cylinder intake air flow rate at a timing preceding by tfwd.

Figure 2:
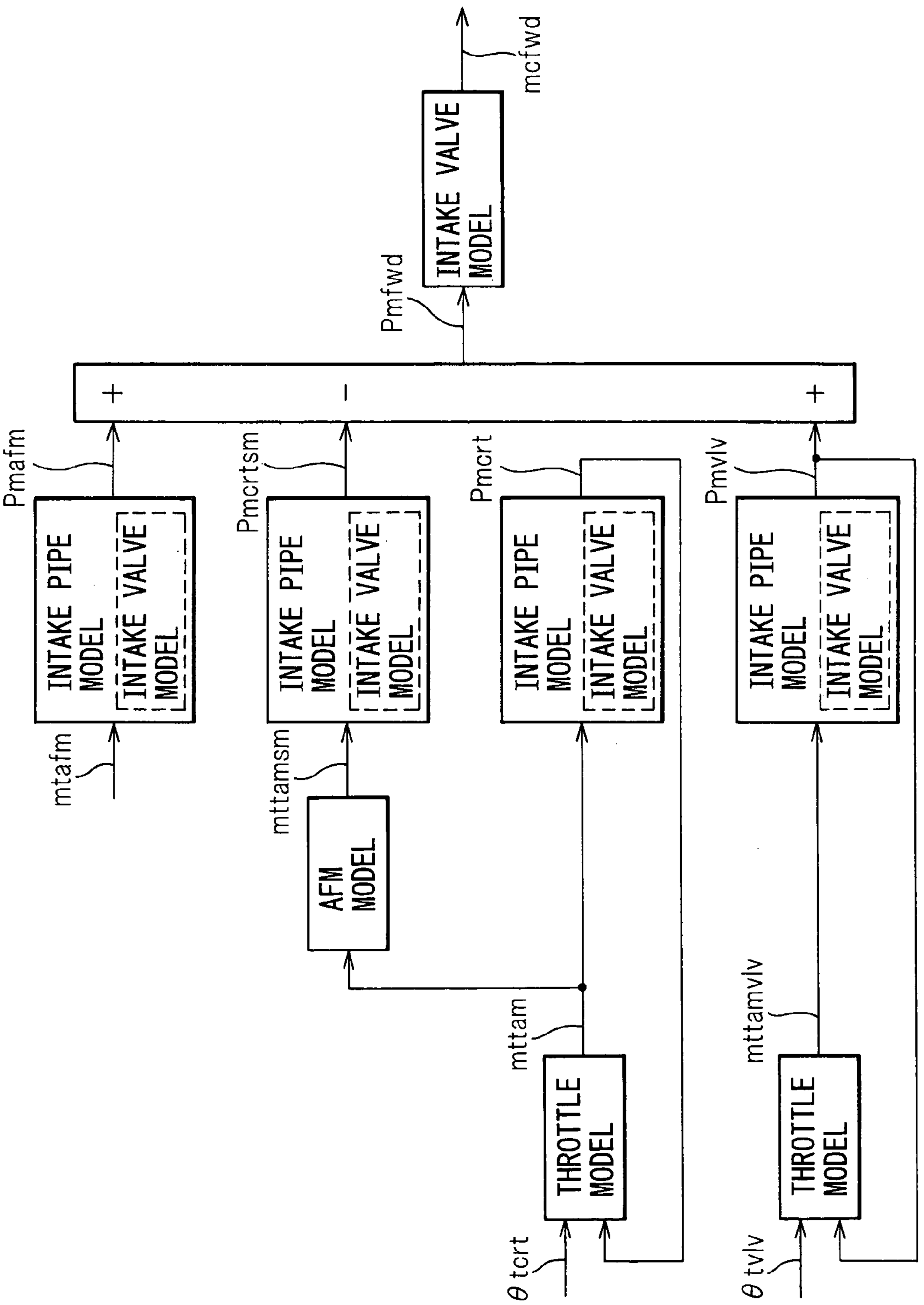
FIG. 2 shows a diagram for explaining an embodiment according to the present invention, in which a forward model is used.

Next, referring to FIG. 2 as well as FIGS. 3 and 4, a method of predicting the closing-timing in-cylinder intake air flow rate mcfwd according to the embodiment of the present invention will be explained roughly.

If a pressure in the intake pipe IM is referred to as an intake pipe pressure Pm (kPa) and an intake pipe pressure Pm at the closing timing of the intake valve is referred to as a closing-timing intake pipe pressure Pmfwd (kPa), in the embodiment of the present invention, the closing-timing intake pipe pressure Pmfwd is first predicted and the closing-timing in-cylinder intake air flow rate mcfwd is then predicted from the predicted closing-timing intake pipe pressure Pmfwd and an intake valve model.

The closing-timing intake pipe pressure Pmfwd is calculated on the basis of the following equation (5):

$$Pmfwd=Pmvlv+(Pmafm-Pmcrtsm) \tag{5}$$

where Pmvlv represents a provisional closing-timing intake pipe pressure (kPa), Pmafm represents a current intake pipe pressure (kPa) calculated from a total air flow meter-detecting air flow rate mtafm which represents a sum of the air flow meter-detecting air flow rates $mtafm_j$ ($mtafm=\Sigma mtafm_j$), and Pmcrtsm represents a current intake pipe pressure (kPa) calculated from mttamsm which will be explained hereinafter.

The provisional closing-timing intake pipe pressure Pmvlv includes calculation errors, and the errors can be expressed by the difference (Pmafm−Pmcrtsm). Therefore, in the embodiment of the present invention, the provisional closing-timing intake pipe pressure Pmvlv is corrected by the difference (Pmafm−Pmcrtsm) to calculate the final closing-timing intake pipe pressure Pmfwd.

The provisional closing-timing intake pipe pressure Pmvlv is calculated in the following manner. First, a closing-timing throttle opening θtvlv, which is the throttle opening θt at the closing timing of the intake valve, is calculated. If an air flow rate passing through the throttle valve 17 is referred to as a throttle valve passing-through air flow rate mt (gram/sec) and the throttle valve passing-through air flow rate mt at the closing timing of the intake valve is referred to as a closing-timing throttle valve passing-through air flow rate mttamvlv (gram/sec), mttamvlv is then calculated from the closing-timing throttle opening θtvlv, Pmvlv calculated in the previous processing cycle, and the throttle model. The provisional closing-timing intake pipe pressure Pmvlv is then calculated from the closing-timing throttle valve passing-through air flow rate mttamvlv and the intake pipe model.

On the other hand, the current intake pipe pressure Pmcrtsm calculated from mttamsm is calculated in the following manner. First, a current value mttam of the throttle valve passing-through air flow rate calculated from the current throttle opening θtcrt is calculated from the current throttle opening θtcrt detected by the throttle opening sensor 40, Pmcrt (explained later) calculated in the previous processing cycle, and the throttle model. Then, mttamsm (gram/sec), which represents a sum of the current air flow meter-detecting air flow rates assuming that air flows through the intake passage by the above-mentioned mttam, is calculated from mttam and an AFM (air flow meter) model. Then, Pmcrtsm is calculated from mttamsm and the intake pipe model. In addition, Pmcrt, which represents a current intake pipe pressure (kPa) calculated from mttam, is calculated from the above-mentioned mttam and the intake pipe model.

Further, Pmafm is calculated from the total air flow meter-detecting air flow rate mtafm and the intake pipe model.

In this manner, in the embodiment according to the present invention, the closing-timing in-cylinder intake air flow rate mcfwd is calculated using the calculation models such as the throttle model, the AFM model, the intake pipe model, and the intake valve model. Next, the calculation models will be explained.

First, the throttle model will be explained. The throttle model is used to calculate the throttle valve passing-through air flow rate mt.

Figure 3:
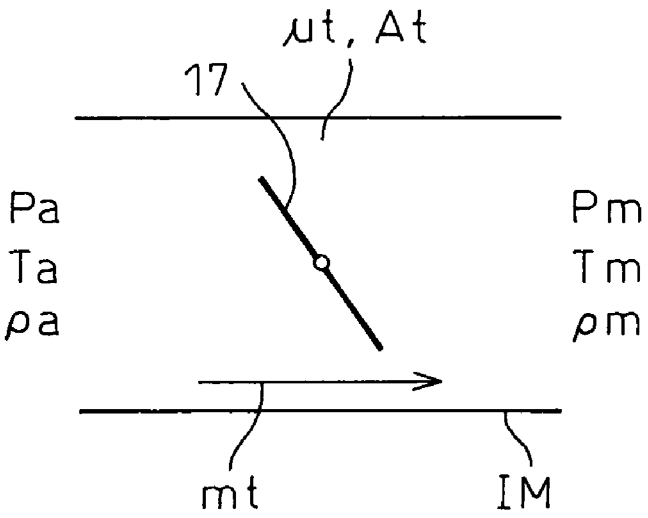
FIG. 3 shows a diagram for explaining a throttle model.
Figure 4:
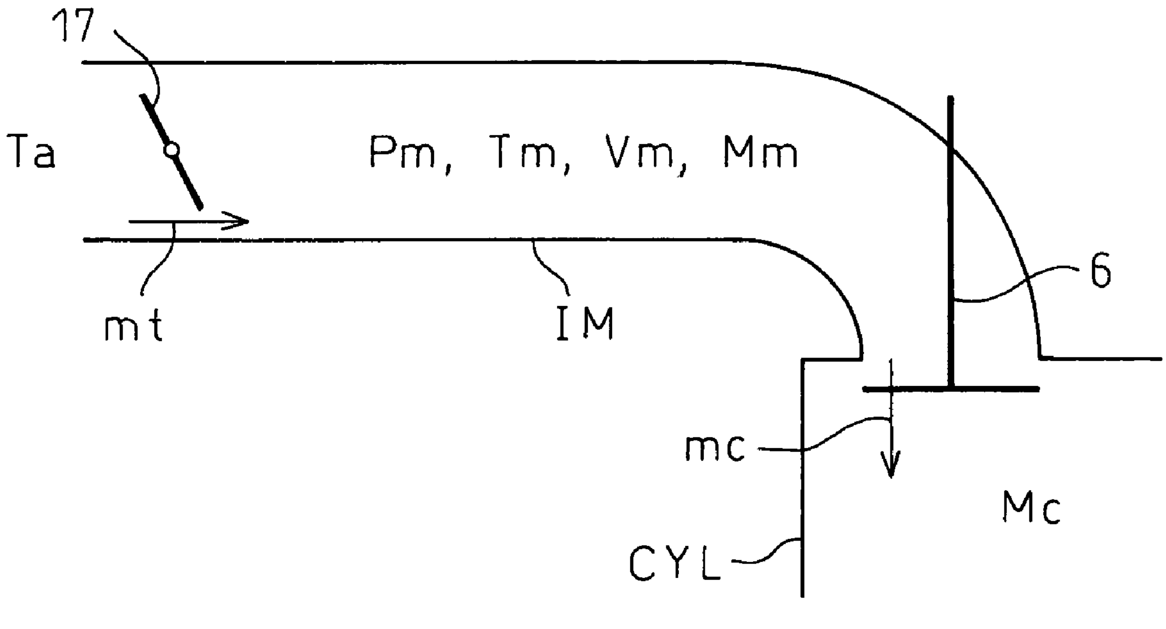
FIG. 4 shows a diagram for explaining an intake pipe model.

As shown in FIG. 3, assuming that a pressure and a temperature upstream of the throttle valve 17 are the atmospheric pressure Pa and the atmospheric temperature Ta, respectively, and that a pressure and a temperature downstream of the throttle valve 17 are the intake pipe pressure Pm and the intake pipe temperature Tm, respectively, the throttle valve passing-through air flow rate mt is expressed by the following equation (6), using the linear velocity vt (m/sec) of air passing through the throttle valve:

$$mt = \mu t \cdot At \cdot vt \cdot \rho m \quad (6)$$

where, μt represents a flow coefficient at the throttle valve 17, At represents an opening area ($m^2$) of the throttle valve 17, ρm represents density ($kg/m^3$) of air downstream of the throttle valve 17 or in the intake pipe IM.

Further, the energy conservation law regarding air upstream and downstream of the throttle valve 17 is expressed by the following equation (7):

$$\frac{v^2}{2} + Cp \cdot Tm = Cp \cdot Ta \quad (7)$$

where Cp represents the specific heat at a constant air pressure.

Furthermore, considering that, at infinity upstream of the throttle valve 17, the cross sectional area of the intake pipe IM is infinite large and the air flow rate is zero, the momentum conservation law regarding air upstream and downstream the throttle valve 17 is expressed by the following equation (8):

$$\rho m \cdot v^2 = Pa - Pm \quad (8)$$

Accordingly, the throttle valve passing-through air flow rate mt is expressed by the following equation (9) from the state equation at the upstream of the throttle valve 17 ($Pa=\rho a \cdot R \cdot Ta$, where ρa represents density ($kg/m^3$) of air at the upstream of the throttle valve 17 or in the atmosphere, and R represents the gas constant), the state equation at the downstream of the throttle valve 17 ($Pm=\rho m \cdot R \cdot Tm$), and the above-mentioned equations (6), (7), and (8):

$$mt = \mu t \cdot At \cdot \frac{Pa}{\sqrt{R \cdot Ta}} \cdot \Phi\left(\frac{Pm}{Pa}\right) \quad (9)$$

$$\Phi\left(\frac{Pm}{Pa}\right) = \begin{cases} \sqrt{\dfrac{\kappa}{2 \cdot (\kappa+1)}} & \cdots \dfrac{Pm}{Pa} \le \dfrac{1}{\kappa+1} \\ \sqrt{\left\{\dfrac{\kappa-1}{2 \cdot \kappa} \cdot \left(1 - \dfrac{Pm}{Pa}\right) + \dfrac{Pm}{Pa}\right\} \cdot \left(1 - \dfrac{Pm}{Pa}\right)} & \cdots \dfrac{Pm}{Pa} > \dfrac{1}{\kappa+1} \end{cases}$$

Figure 5A:
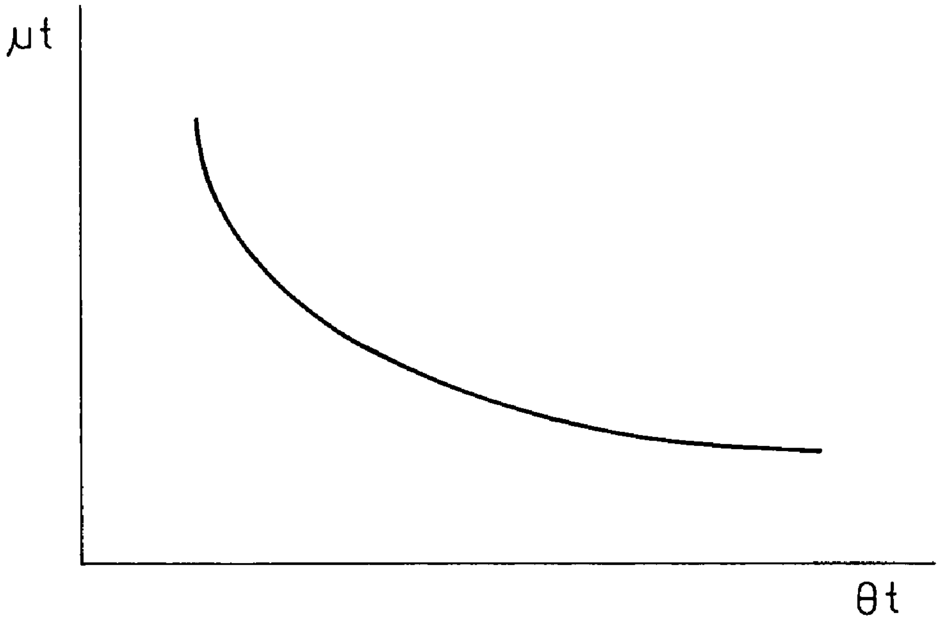
FIGS. 5A and 5B show diagrams illustrating a flow coefficient μt and an opening area At of a throttle valve, respectively.
Figure 5B:
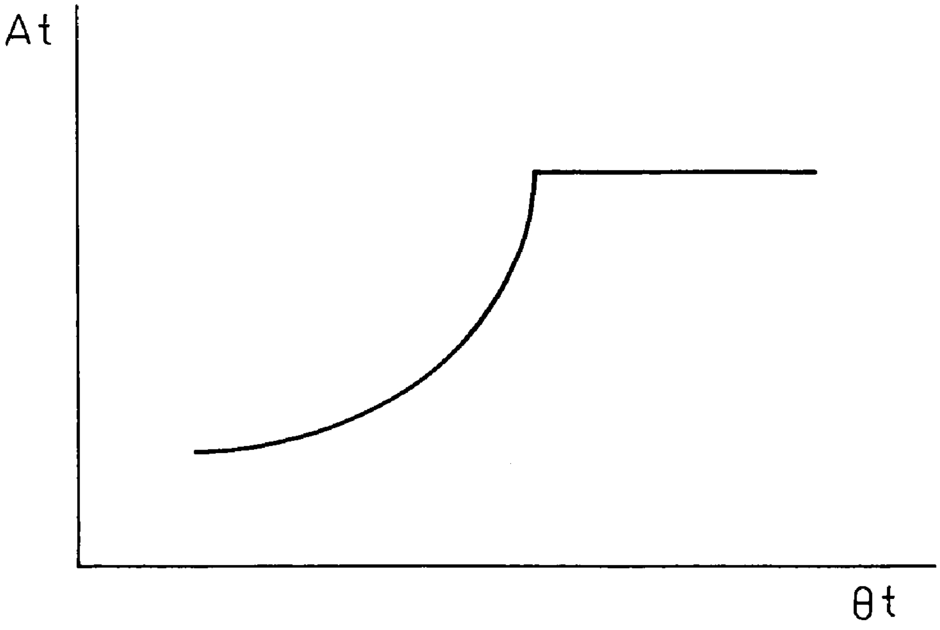

Note that the flow coefficient μt and opening area At are obtained from experiments in advance as a function of the throttle opening θt, and are stored in the ROM 32 in the form of maps as shown in FIGS. 5A and 5B, respectively.

When mttamvlv should be calculated, (mttamvlv, θtvlv, Pmvlv) are substituted for (mt, θt, Pm) in the throttle model. When mttam should be calculated, (mttam, θtcrt, Pmcrt) are substituted for (mt, θt, Pm) in the throttle model.

A method of estimating the closing-timing throttle opening θtvlv will be explained briefly. In the embodiment according to the present invention, a basic target throttle opening is calculated on the basis of the depression ACC of the accelerator pedal 43. After a predetermined delay time has passed, the target throttle opening is set to the basic target throttle opening and the throttle valve 17 is controlled to make the actual throttle opening equal to the target throttle opening. In other words, the change of the target throttle opening is delayed by the delay time from the change of the depression of the accelerator pedal 43. This makes it possible to find how to change the actual throttle opening θt from now to the timing after the delay time has passed, as the current throttle opening and the target throttle opening after the delay time has passed from now have been obtained. Therefore, the closing-timing throttle opening θtvlv can be estimated. Note that the delay time is set longer than a time which the above-mentioned time tfwd can be.

Next, the intake pipe model will be explained. The intake pipe model is used to calculate the intake pipe pressure Pm, the intake pipe temperature Tm, and a pressure-temperature ratio PBYT (=Pm/Tm).

The intake pipe model of the embodiment according to the present invention focuses on the mass conservation law and the energy conservation law regarding the intake pipe IM. Specifically, the flow rate of air entering the intake pipe IM is equal to the throttle valve passing-through air flow rate mt and the flow rate of air exiting from the intake pipe IM is equal to the in-cylinder intake air flow rate mc, as shown in FIG. 4, and therefore, the mass conservation law and the energy conservation law regarding the intake pipe IM are expressed by the following equations (10) and (11), respectively:

$$\frac{dMm}{dt} = mt - mc \tag{10}$$

$$\frac{d(Mm \cdot Cv \cdot Tm)}{dt} = Cp \cdot mt \cdot Ta - Cp \cdot mc \cdot Tm \tag{11}$$

where Mm represents an amount of air (gram) existing in the intake pipe IM, t represents time, Vm represents a volume ($m^3$) of the intake pipe IM, and Cv represents the specific heat at constant volume of air.

The equations (10) and (11) can be rewritten to the following equations (12) and (13), respectively, using the state equation (Pm·Vm=Mm·R·Tm), Mayer's relation (Cp=Cv+R), and the specific heat ratio K (=Cp/Cv):

$$\frac{dPBYT}{dt} = \frac{R}{Vm} \cdot (mt - mc) \tag{12}$$

$$\frac{dPm}{dt} = \kappa \cdot \frac{R}{Vm} \cdot (mt \cdot Ta - mc \cdot Tm) \tag{13}$$

Therefore, the pressure-temperature ratio PBYT and the intake pipe pressure Pm can be calculated by sequentially solving the equations (12) and (13), respectively, and the intake pipe temperature Tm can also be calculated (Tm=Pm/PBYT). In the actual calculation, the equations (12) and (13) are expressed as in the equations (14) and (15), respectively, using the time interval of calculation Δt and a parameter i expressing the number of calculation cycle:

$$PBYT(i) = PBYT(i-1) + \Delta t \cdot \frac{R}{Vm} \cdot (mt(i-1) - mc(i-1)) \tag{14}$$

$$Pm(i) = Pm(i-1) + \Delta t \cdot \kappa \cdot \frac{R}{Vm} \cdot (mt(i-1) \cdot Ta - mc(i-1) \cdot Tm(i-1)) \tag{15}$$

In these equations, the specific heat ratio K, the gas constant R, and the volume Vm of the intake pipe IM are constant, and the atmospheric temperature Ta is detected by the atmospheric temperature sensor.

The in-cylinder intake air flow rate mc in the equations (12) and (13) or the equations (14) and (15) is calculated using the intake valve model. Next, the intake valve model will be explained.

It has been experimentally and theoretically proved that there is a linear relationship between the in-cylinder intake air flow rate mc and the intake pipe pressure Pm. Thus, in the intake valve model of the embodiment according to the present invention, the in-cylinder intake air flow rate mc is calculated using the following equation (16):

$$mc = \frac{Ta}{Tm} \cdot (ka \cdot Pm - kb) \tag{16}$$

where ka and kb are constants set in accordance with the engine operating condition such as the engine speed.

When Pmvlv should be calculated, (mttamvlv, mcvlv, Pmvlv, Tmvlv) are substituted for (mt, mc, Pm, Tm) in the intake pipe model and the intake valve model, where mcvlv and Tmvlv represent the in-cylinder intake air flow rate at the closing timing of the intake valve and the intake pipe temperature at the closing timing of the intake valve, both of which are calculated from mttamvlv, respectively. When Pmcrt should be calculated, (mttam, mccrt, Pmcrt, Tmcrt) are substituted for (mt, mc, Pm, Tm) in the intake pipe model and the intake valve model, where mccrt and Tmcrt represent the current in-cylinder intake air flow rate and the current intake pipe temperature, both of which are calculated from mttam, respectively. When Pmcrtsm should be calculated, (mttamsm, mccrtsm, Pmcrtsm, Tmcrtsm) are substituted for (mt, mc, Pm, Tm) in the intake pipe model and the intake valve model, where mccrtsm and Tmcrtsm represent the current in-cylinder intake air flow rate and the current intake pipe temperature, both of which are calculated from mttamsm, respectively. When Pmafm should be calculated, (mtafm, mcafm, Pmafm, Tmafm) are substituted for (mt, mc, Pm, Tm) in the intake pipe model and the intake valve model, where mcafm and Tmafm represent the current in-cylinder intake air flow rate and the current intake pipe temperature, both of which are calculated from mtafm, respectively.

As mentioned above, the intake valve model is used also to calculate the final closing-timing in-cylinder intake air flow rate mcfwd. In this case, (mcfwd, Pmfwd, Tmfwd) are substituted for (mc, Pm, Tm), where Tmfwd represents the intake pipe temperature at the closing timing of the intake valve.

Next, the AFM model will be explained. The AFM model is used to calculate mttamsm.

Figure 6A:
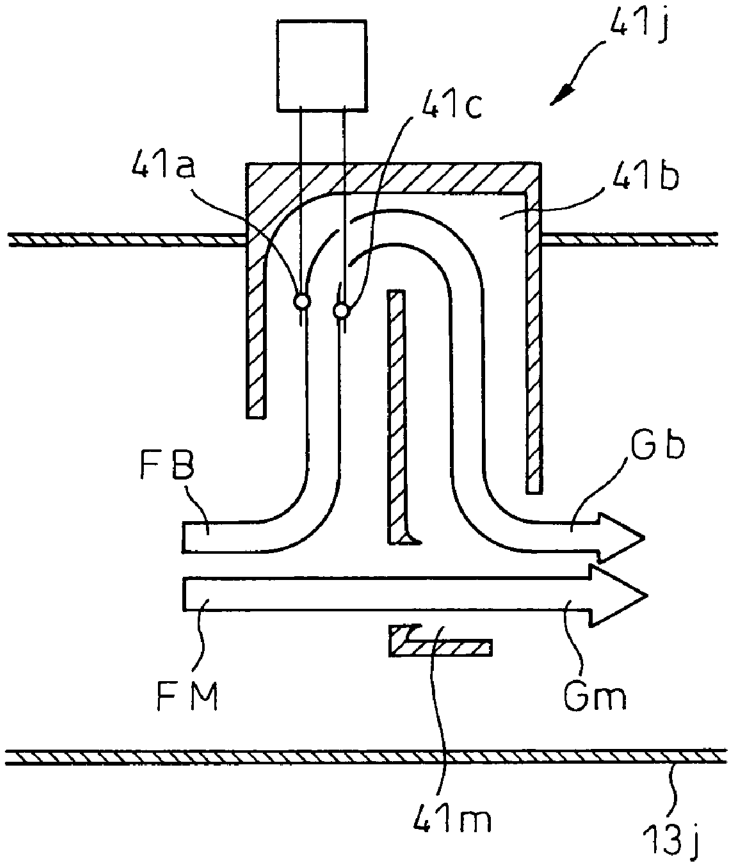
FIGS. 6A and 6B show details of an air flow meter.
Figure 6B:
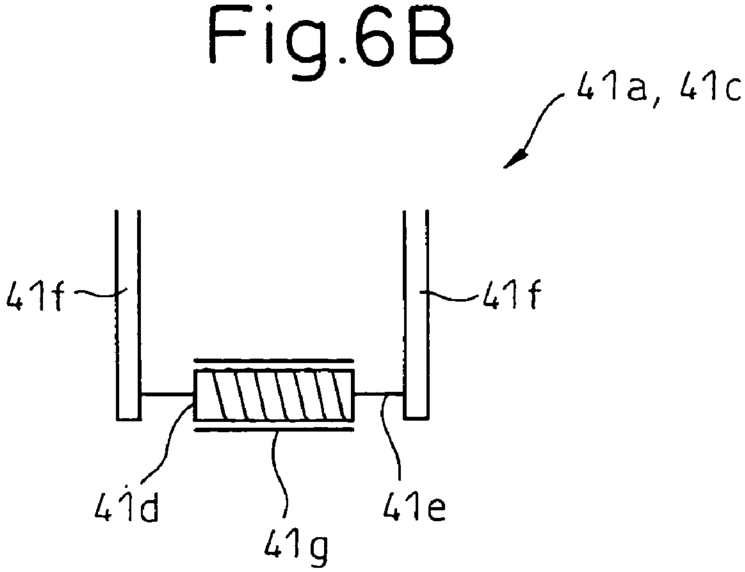

The air flow meter 41$_j$ (j=1, 2) will first be explained. As shown in FIG. 6A, the air flow meter 41$_j$ is of a flow dividing type, which has a bypass passage 41*b* through which a part of air flowing through the intake divided-flow pipe 13$_j$ is introduced. In this case, the air flowing through the intake divided-flow pipe 13$_j$ is constituted by a bypass flow FB flowing through the bypass passage 41*b* and a main flow FM flowing through a main passage 41*m* other than the bypass passage 41*b*. The air flow rate of the main flow FM corresponds to the flow rate of air flowing through the intake divided-flow pipe 13$_j$ or the throttle valve passing-through air flow rate mt. Further, the air flow meter 41*j* is of a thermal type comprising a resistance 41*a* for detecting the intake air temperature and a heating resistance 41*c*, both arranged in the bypass passage 41*b*. As shown in FIG. 6B, each resistance 41*a*, 41*c* comprises a bobbin 41*d* of alumina around which a platinum wire is wound, and the bobbin 41*d* is supported by support bodies 41*f* via wire leads 41*e*. Further, the bobbin 41*d* is covered by a glass coating 41*g*. A voltage is applied to the heating resistance 41*c* to maintain the difference between the temperatures of the detecting resistance 41*a* and the heating resistance 41*c* at constant. Thus, for example, when the amount of air flowing through the intake divided-flow pipe 13*j* increases and the heat radiation amount from the heating resistance 41*c* to the surrounding air increases, the voltage applied to the heating resistance 41*c* is increased by the increase of the air amount. Therefore, the amount of air flowing through the intake divided-flow pipe 13$_j$ can be found on the basis of the voltage applied to the heating resistance 41*c* or the output voltage from the air flow meter 41$_j$.

There is a lag in heat radiation from the heating resistance 41*c* to the air due to heat conduction between the air and the bobbin 41*d* and between the air and the support bodies 41*f*, and thus there may be a response lag in the output of the air flow meter 41$_j$. Therefore, the AFM model of the embodiment according to the present invention considers that heat radiation from the heating resistance 41_c_ is constituted by heat radiation from the bobbin 41_d_ and that from the support bodies 41_f_, and focuses on the heat radiation amounts from the bobbin 41_d_ and the support bodies 41_f_.

If the heat radiation amounts from the bobbin 41_d_ and the support bodies 41_f_ of the air flow meter $41_j$, assuming that there is no response lag, are referred to as true heat radiation amounts $Wb_j$, $Ws_j$, respectively, and the heat radiation amounts from the bobbin 41_d_ and the support bodies 41_f_ of the air flow meter $41_j$ with response lag are referred to as response heat radiation amounts $wb_j$, $ws_j$, respectively, the response heat radiation amounts $wb_j$, $ws_j$ are expressed by the following equations (17) and (18), on the basis of the first order lag process of the true heat radiation amounts $Wb_j$, $Ws_j$:

$$\frac{dwb_j}{dt} = \frac{Wb_j - wb_j}{\tau b_j} \tag{17}$$

$$\frac{dws_j}{dt} = \frac{Ws_j - ws_j}{\tau s_j} \tag{18}$$

where $\tau b_j$ represents a time constant regarding the response heat radiation amount $wb_j$ of the bobbin 41_d_ of the air flow meter $41_j$, and $\tau s_j$ represents a time constant regarding the response heat radiation amount $ws_j$ of the support bodies 41_f_ of the air flow meter $41_j$. In the actual calculation, the equations (17) and (18) are expressed by the equations (19) and (20), respectively, using the time interval of calculation $\Delta t$ and a parameter i expressing the number of calculation cycle:

$$wb_j(i) = \Delta t \cdot \frac{Wb_j(i) - wb_j(i)}{\tau b_j} + wb_j(i-1) \tag{19}$$

$$ws_j(i) = \Delta t \cdot \frac{Ws_j(i) - ws_j(i)}{\tau s_j} + ws_j(i-1) \tag{20}$$

Figure 7:
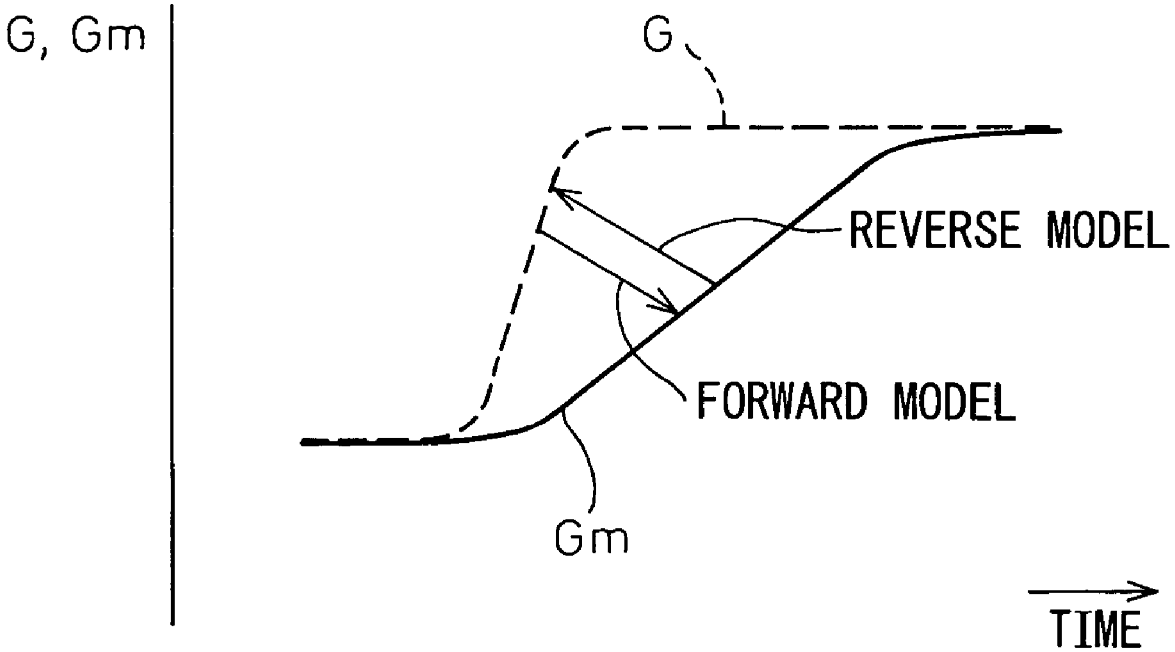
FIG. 7 shows a diagram for explaining a forward model and a reverse model.

As shown in FIG. 7, when air flows through the intake duct 13 at a flow rate G (gram/sec), there may be a response lag in a total air flow meter-detecting air flow rate Gm (gram/sec). In the embodiment according to the present invention, a model for calculating Gm from G is referred to as a forward model, and a model for calculating G from Gm is referred to as a reverse model.

In the AFM model using the forward model, the total air flow meter-detecting air flow rate Gm, assuming that the flow rate of air flowing through the intake duct 13 is equal to G, is estimated. In this case, a flow rate $G_j$ (gram/sec) of air flowing through each intake divided-flow pipe $13_j$ is expressed by the following equation (21), using the divided-flow ratio $r_j$ (j=1, 2):

$$G_j = G \cdot r_j \tag{21}$$

Figure 8A:
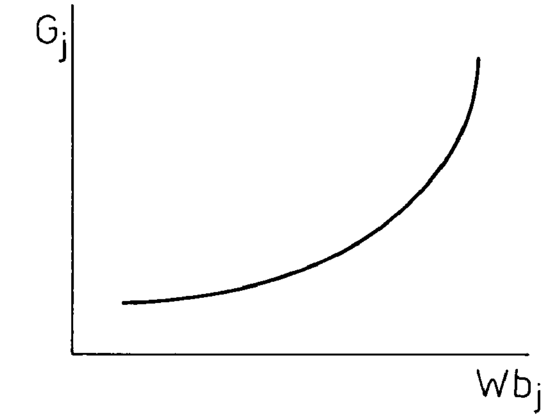
FIG. 8A-8F show diagrams illustrating an air flow rate $G_j$, time constants $\tau b_j$, $\tau s_j$, an air flow rate $Gm_j$, and an air flow rate $g_j$.
Figure 8B:
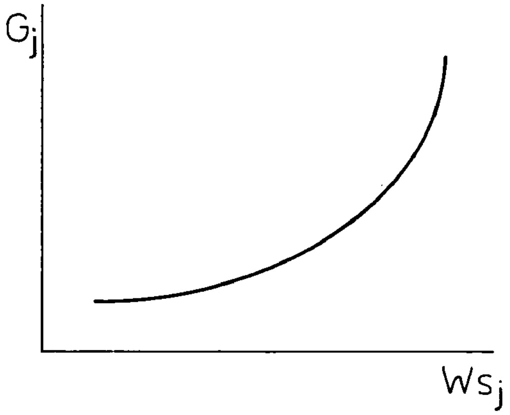

Next, a method of calculating the total air flow meter-detecting air flow rate Gm will be explained. First, the true heat radiation amounts $Wb_j$, $Ws_j$ of the bobbin 41_d_ and the support bodies 41_f_ of each air flow meter $41_j$, assuming that the flow rate of air flowing through each intake divided-flow pipe $13_j$ is equal to $G_j$, is calculated. The relationships between the air flow rate $G_j$ and the true heat radiation amounts $Wb_j$, $Ws_j$ are obtained in advance in the form of maps shown in FIGS. 8A and 8B, respectively, and are stored in the ROM 32 in advance. Note that the relationships between the air flow rate and the true heat radiation amounts shown in FIGS. 8A and 8B are expressed as functions $f_A$ and $f_B$, respectively.

Figure 8C:
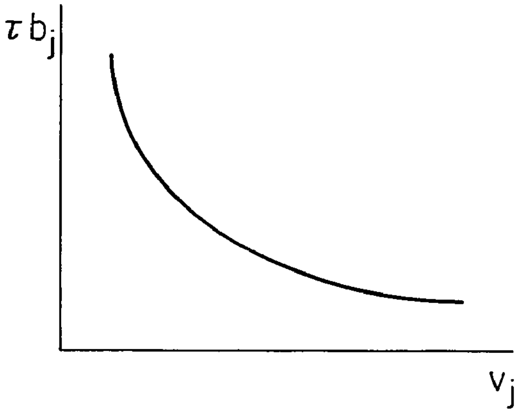
Figure 8D:
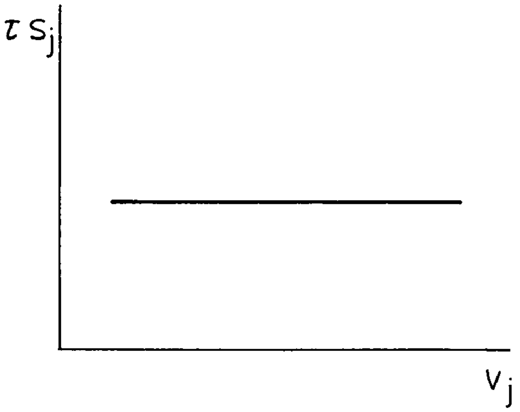

Then, the time constants $\tau b_j$, $\tau s_j$ are calculated on the basis of the output voltage $v_j$ of the air flow meter $41_j$. Specifically, if an output voltage of the air flow meter $41_j$ is referred to an air flow meter output voltage $v_j$, the relationships between the air flow meter output voltage $v_j$ and the time constants $\tau b_j$, $\tau s_j$ are obtained in advance in the form of maps shown in FIGS. 8C and 8D, respectively, and are stored in the ROM 32 in advance. Note that the relationships between the air flow meter output voltage and the time constants shown in FIGS. 8C and 8D are expressed as functions $f_C$ and $f_D$, respectively.

Figure 8E:
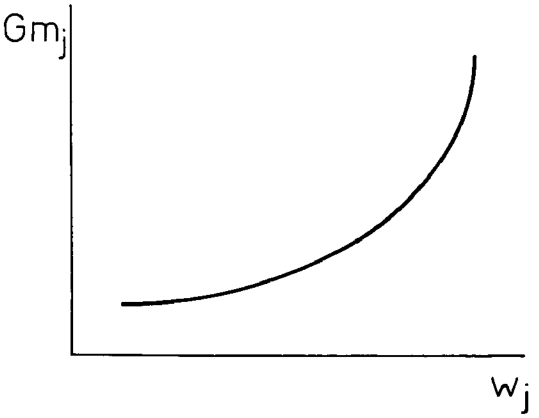

Then, the response heat radiation amounts $wb_j$, $ws_j$ are calculated from the equations (19), (20), respectively. Then, a total response heat radiation amount $w_j$, which is a sum of the response heat radiation amounts $wb_j$, $ws_j$, is calculated ($w_j = wb_j + ws_j$). Then, each air flow meter-detecting air flow rate $Gm_j$ is calculated from the corresponding total response heat radiation amount $w_j$. The relationships between the total response heat radiation amount $w_j$ and the air flow meter-detecting air flow rate $Gm_j$ are obtained in advance in the form of maps shown in FIG. 8E, and are stored in the ROM 32 in advance. Note that the relationships between the total response heat radiation amount and the air flow meter-detecting air flow rate shown in FIG. 8E is expressed as a function $f_E$.

Then, the total air flow meter-detecting air flow rate Gm ($=\Sigma Gm_j$) is calculated. In other words, the air flow meter-detecting air flow rates $Gm_j$, assuming that the flow rate of air flowing through each intake divided-flow pipe $13_j$ is equal to $G_j$, are estimated.

When mttamsm should be calculated, (mttam, mttamsm) are substituted for (G, Gm) in the AFM model.

As can be understood from the above, both of mttamsm calculated from the AFM model and the air flow meter-detecting air flow rate mtafm include the response lags, and the response of mttamsm and mtafm are made identical. Thus, the response of Pmcrtsm calculated from mttamsm and Pmafm calculated from mtafm are also made identical. Therefore, the difference between Pmafm and Pmcrtsm (=Pmafm−Pmcrtsm) represents the errors of the calculation model. Accordingly, Pmfwd calculated from the equation (5) accurately expresses the closing-timing intake pipe pressure. In addition, compensation for the response lag is performed on the dimension of the heat radiation amount and, therefore, the closing-timing intake pipe pressure Pmfwd is calculated accurately.

Figure 8F:
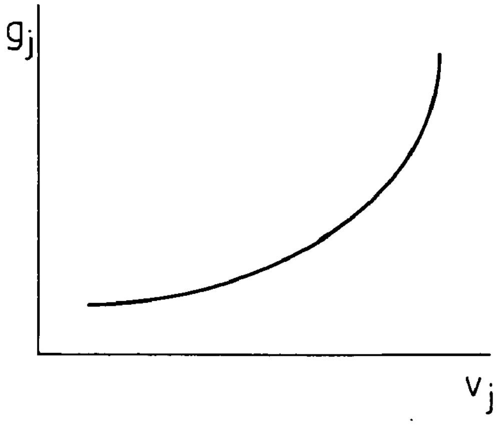

On the other hand, each air flow meter-detecting air flow rate $mtafm_j$ as mentioned above is calculated. Specifically, the relationships between the air flow rate $g_j$ and the air flow meter output voltage $v_j$ are obtained in advance in the form of maps shown in FIG. 8F, and are stored in the ROM 32 in advance. The air flow rate $g_j$ (gram/sec) is calculated from the actual air flow meter output voltage $v_j$, and is substituted for the air flow meter-detecting air flow rate $mtafm_j$. Note that the air flow rate and the air flow meter output voltage shown in FIG. 8F is expressed as a function $f_F$.

Figure 9:
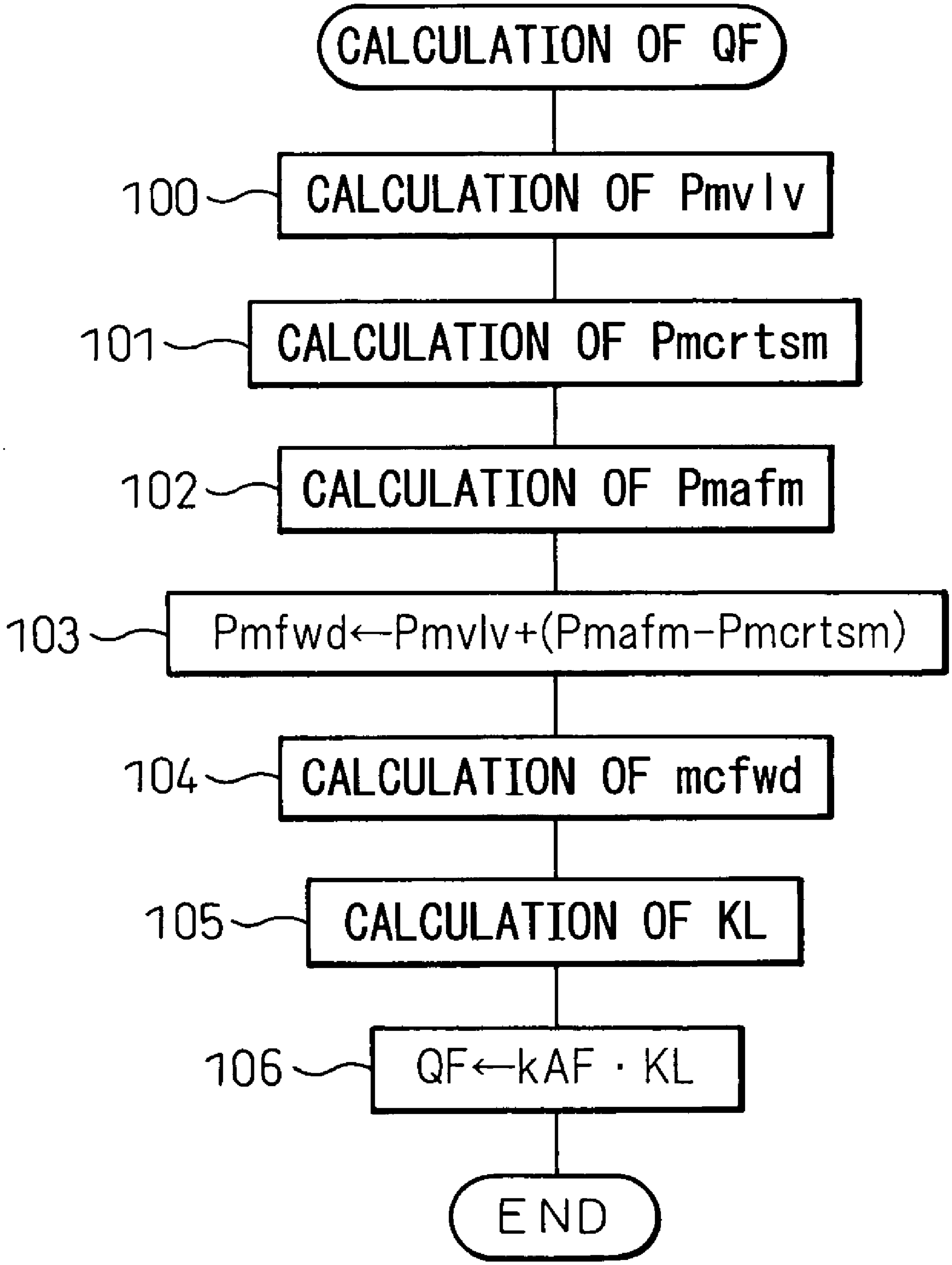
FIG. 9 shows a flowchart illustrating a routine for calculating a fuel injection amount QF.

FIG. 9 shows a calculation routine of the fuel injection amount QF according to the embodiments of the present invention. This routine is executed by interruption every predetermined time.

Referring to FIG. 9, first, in step 100, Pmvlv is calculated. In the following step 101, Pmcrtsm is calculated. In the following step 102, Pmafm is calculated. In the following step 103, the closing-timing intake pipe pressure Pmfwd is calculated. In the following step 104, the closing-timing in-cylinder intake air flow rate mcfwd is calculated. In the following step 105, the engine load ratio KL is calculated. In the following step 106, the fuel injection amount QF is calculated.

Figure 10:
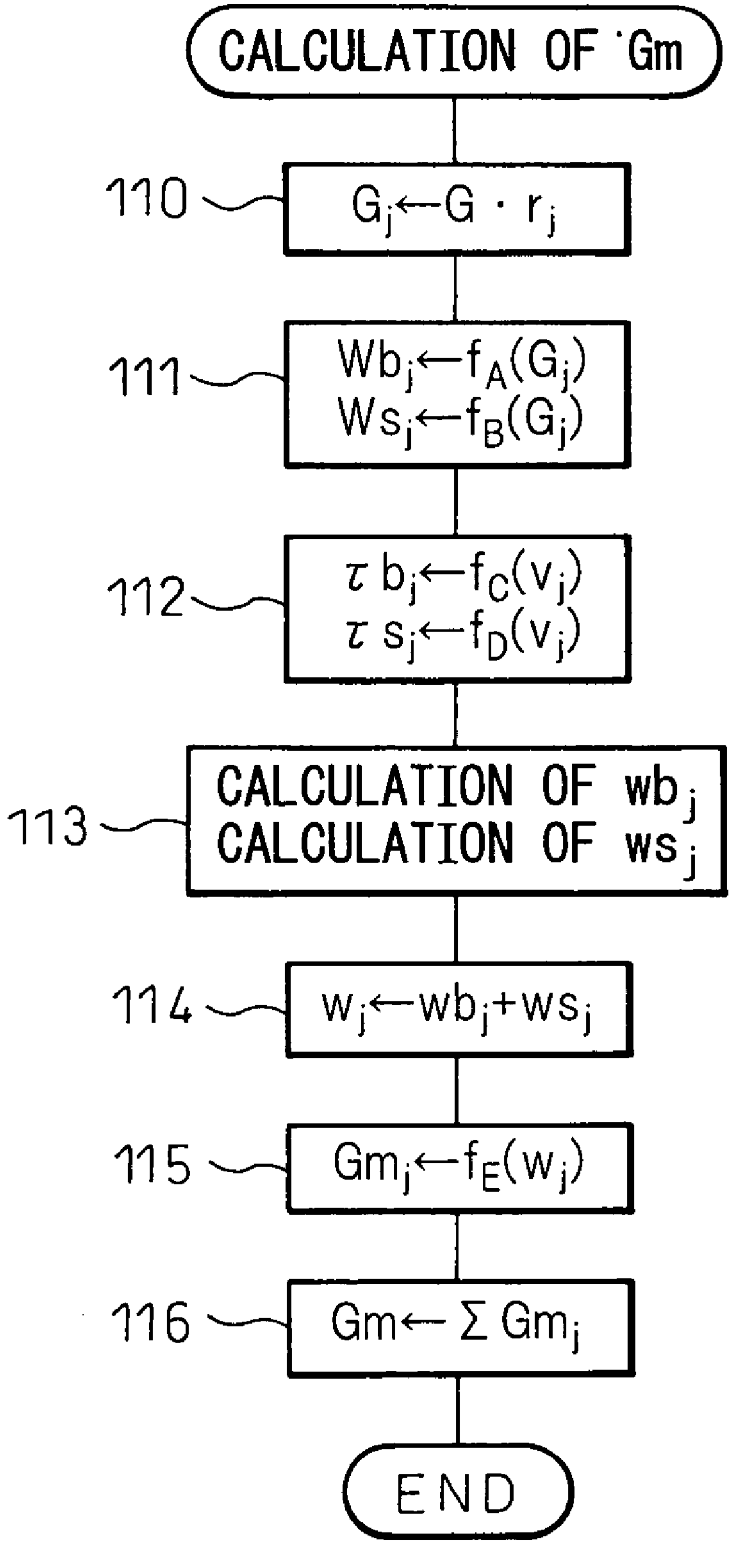
FIG. 10 shows a flowchart illustrating a routine for calculating an air flow rate Gm.

FIG. 10 shows a calculation routine of the air flow rate Gm according to the embodiment of the present invention. This routine is executed in step 101 shown in FIG. 9.

Referring to FIG. 10, in step 110, the flow rates $G_j$ (j=1, 2) of air flowing through the respective intake divided-flow pipes $\mathbf{13}_j$ are calculated from the equation (21). In the following step 111, the true heat radiation amounts $Wb_j$, $Ws_j$ are calculated from the respective air flow rates $G_j$ and the respective functions $f_A$, $f_B$ (see FIGS. 8A and 8B). In the following step 112, the time constants $\tau b_j$, $\tau s_j$ are calculated from the respective air flow meter output voltages $v_j$ and the respective functions $f_C$, $f_D$ (see FIGS. 8C and 8D). In the following step 113, the response heat radiation amounts $wb_j$, $ws_j$ are calculated from the respective equations (19), (20). In the following step 114, the total response heat radiation amounts $w_j$ are calculated ($w_j$=$wb_j$+$ws_j$). In the following step 115, the air flow meter-detecting air flow rates $Gm_j$ are calculated from the respective total response heat radiation amounts $w_j$ and the function $f_E$ (see FIG. 8E). In the following step 116, the total air flow meter-detecting air flow rate Gm is calculated (Gm=$\Sigma Gm_j$). In the step 101 in FIG. 9, G is substituted for mttam, and Gm calculated in step 116 in FIG. 10 is substituted for mttamsm.

Figure 11:
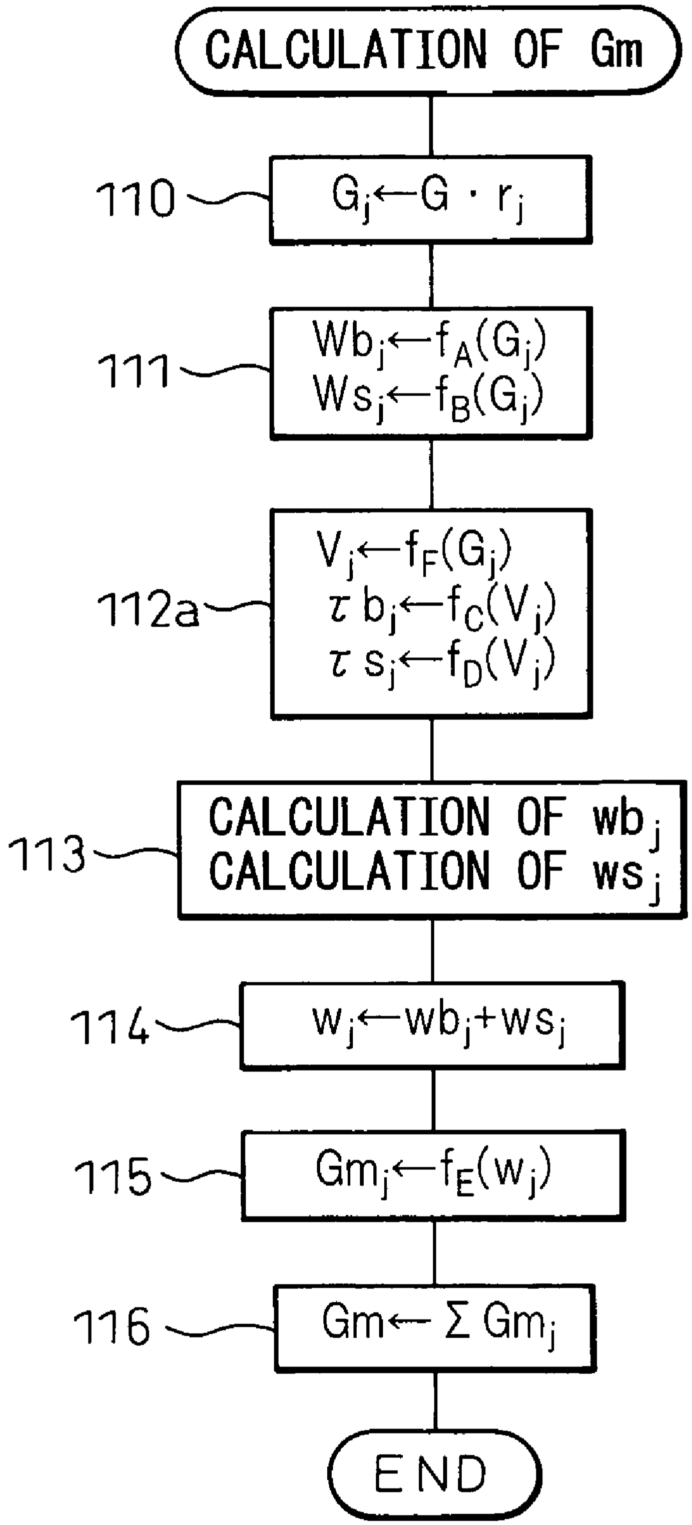
FIGS. 11–16 show flowcharts illustrating routines for calculating an air flow rate Gm, according to alternative embodiments of the present invention, respectively.

Alternatively, the routine shown in FIG. 10 may be changed as in FIG. 11. The routine shown in FIG. 11 is identical to that shown in FIG. 10, except that step 112 in FIG. 10 is replaced with step 112*a*.

In step 112*a*, the air flow meter output voltages $V_j$, which correspond to the respective air flow rates $G_j$ calculated in step 110, are calculated from the function $f_F$ (see FIG. 8F). Then, the time constants $\tau b_j$, $\tau s_j$ are calculated from the respective air flow meter output voltages $V_j$ and the respective functions $f_C$, $f_D$.

Next, an alternative embodiment according to the present invention will be explained.

In the alternative embodiment according to the present invention, the air flow meter-detecting air flow rates $Gm_j$, assuming that air, of which flow rate is equal to G, flows through the intake divided-flow pipes $\mathbf{13}_j$ substantially uniformly, are calculated, and the total air flow meter-detecting air flow rates Gm is then calculated (Gm=$\Sigma Gm_j$). In this case, the flow rates $G_j$ of air flowing through the respective intake divided-flow pipes $\mathbf{13}_j$ are substantially identical to each other, and thus are expressed by Gx (gram/sec). Here, assuming that there are provided n intake divided-flow pipes $\mathbf{13}_j$ and n air flow meters $\mathbf{41}_j$ (j=1, 2, . . . , n), Gx can be expressed by the following equation (22):

$$Gx = \frac{G}{n} \tag{22}$$

The true heat radiation amounts $Wb_j$, $Ws_j$, the response heat radiation amounts $wb_j$, $ws_j$, the time constants $\tau b_j$, $\tau s_j$, the total response heat radiation amounts $w_j$, and the air flow meter-detecting air flow rates $Gm_j$, of the air flow meters $\mathbf{41}_j$, are also substantially identical to each other and, therefore, are expressed by Wbx, Wsx, wbx, wsx, τbx, τsx, wx, and Gmx, respectively, hereinafter.

Figure 12:
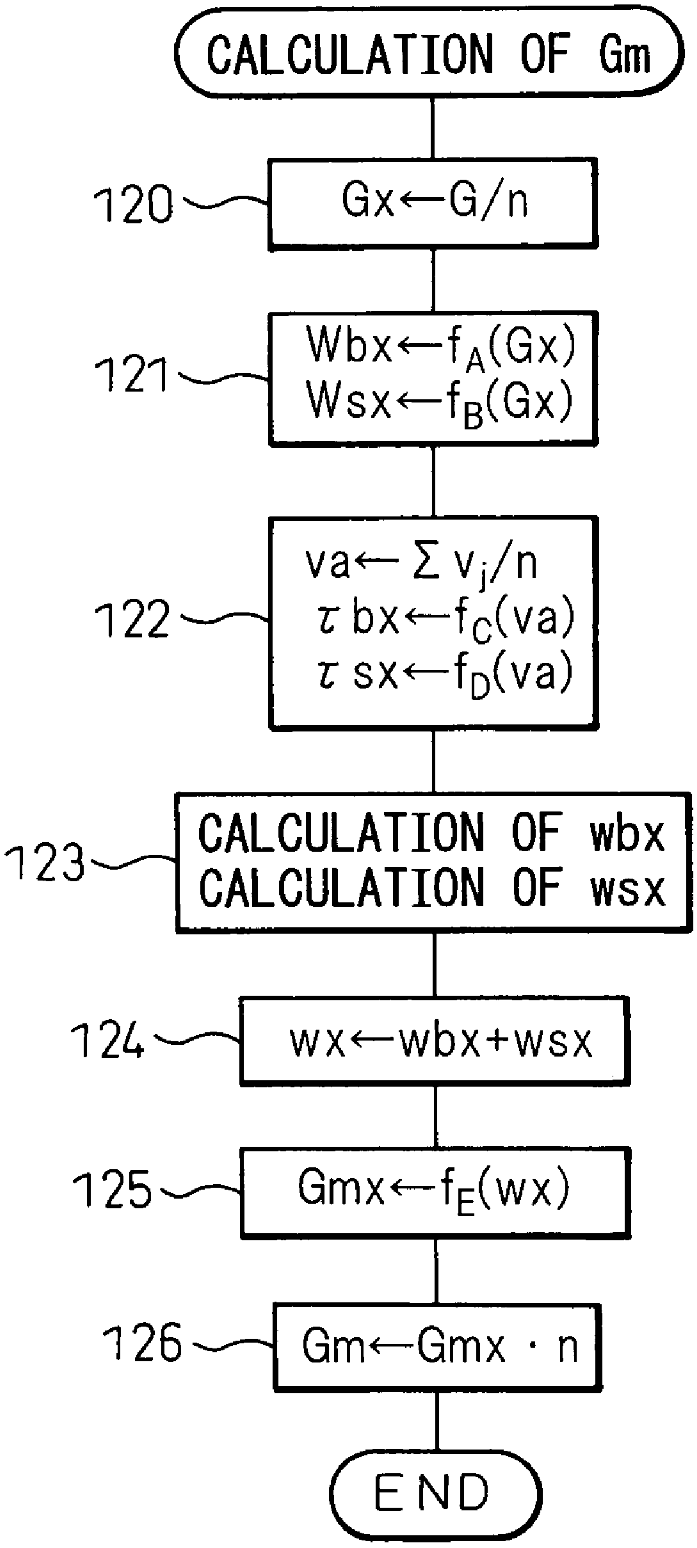

FIG. 12 shows a calculation routine of the air flow rate Gm according to the alternative embodiment of the present invention. This routine is executed in step 101 shown in FIG. 9, as in the routine shown in FIG. 10.

Referring to FIG. 12, in step 120, the flow rate Gx of air flowing through each intake divided-flow pipe $\mathbf{13}_j$ (j=1, 2, . . . , n) is calculated from the equation (22). In the following step 121, the true heat radiation amounts Wbx, Wsx are calculated from the air flow rate Gx and the respective functions $f_A$, $f_B$. In the following step 122, an average va of the air flow meter output voltages $v_j$ is calculated (va=$\Sigma v_j/n$), and the time constants τbx, τsx are calculated from the average voltage va and the respective functions $f_C$, $f_D$. In the following step 123, the response heat radiation amounts wbx, wsx are calculated from the respective equations (19), (20). In the following step 124, the total response heat radiation amount wx is calculated (wx=wbx+wsx). In the following step 125, the air flow meter-detecting air flow rate Gmx is calculated from the function $f_E$. In the following step 126, the total air flow meter-detecting air flow rate Gm is calculated (Gm=Gmx·n).

Figure 13:
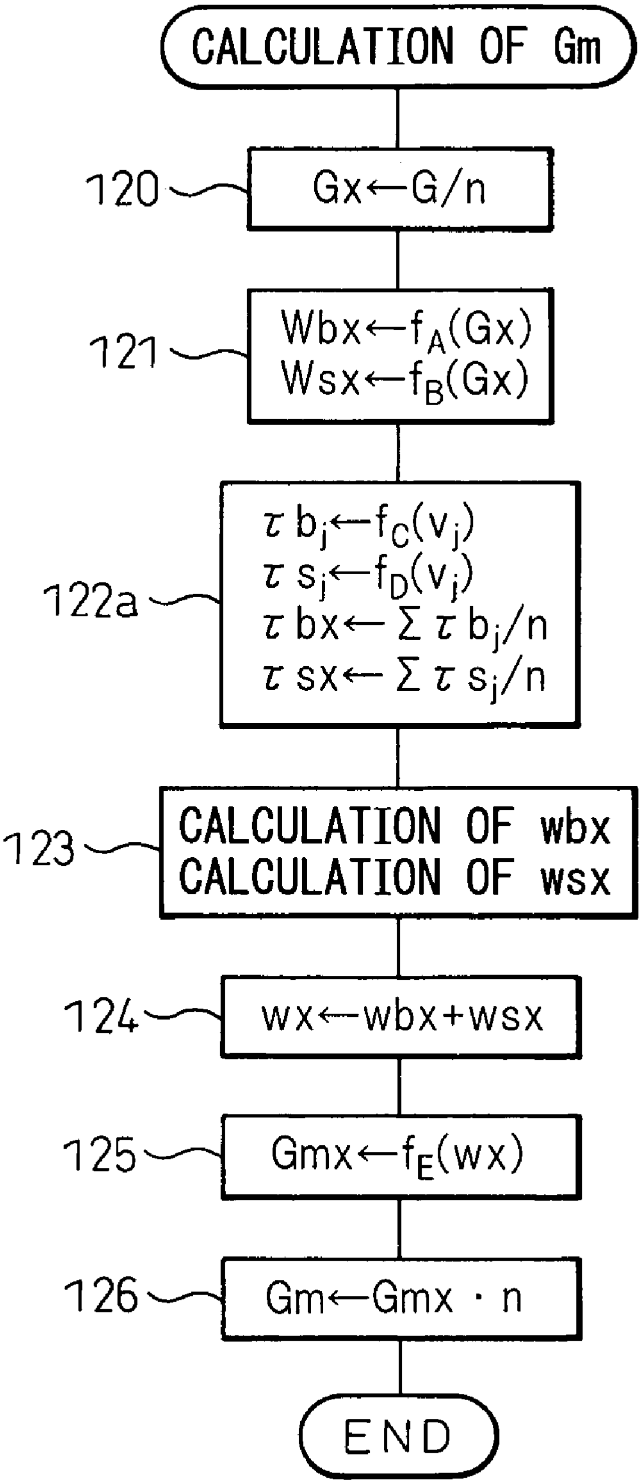
Figure 14:
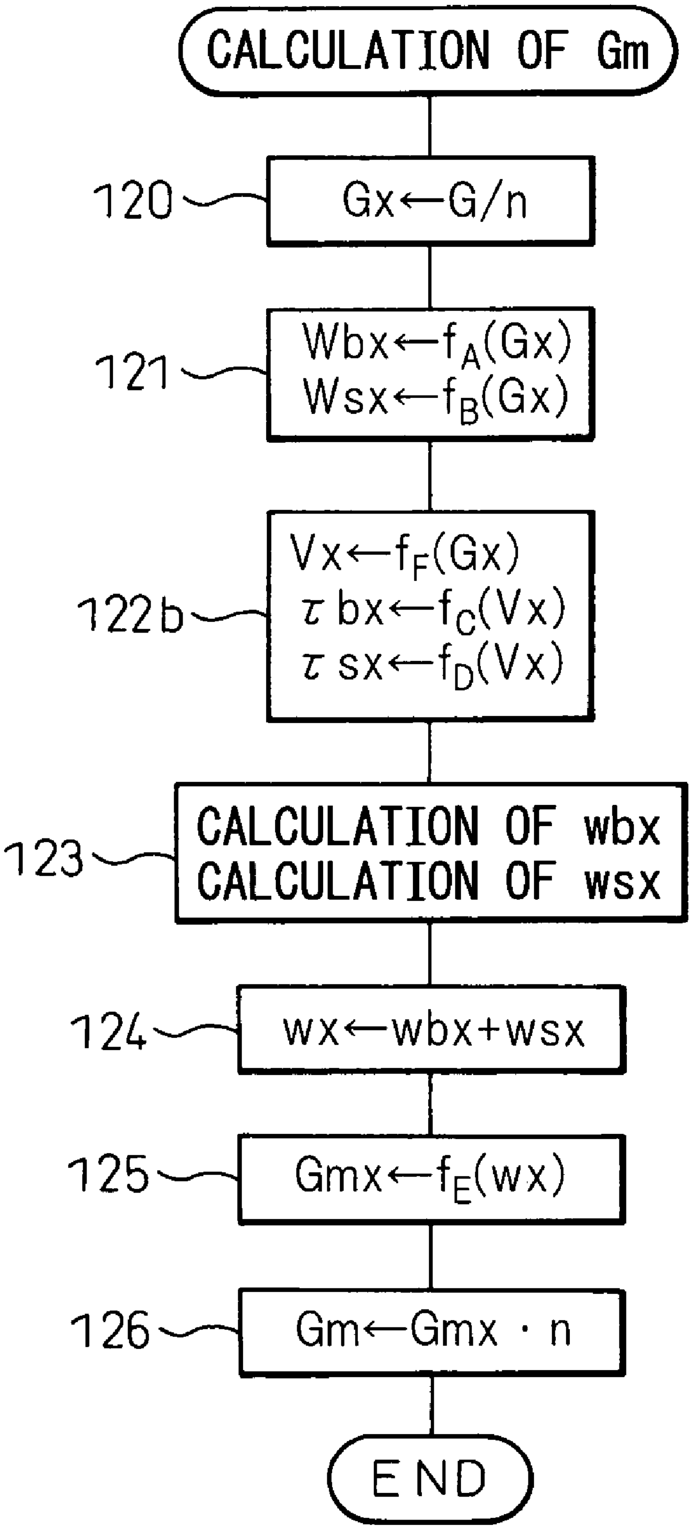

Alternatively, the routine shown in FIG. 12 may be changed as in FIG. 13 or 14.

The routine shown in FIG. 13 is identical to that shown in FIG. 12, except that step 122 in FIG. 12 is replaced with step 122*a*. In step 122*a*, the time constants $\tau b_j$, $\tau s_j$ are calculated from the respective air flow meter output voltages $v_j$ and the respective functions $f_C$, $f_D$. Then, the time constants τbx, τsx are calculated as averages of the respective time constants $\tau b_j$, $\tau s_j$ (τbx=$\Sigma\tau b_j/n$, τsx=$\Sigma\tau s_j/n$).

On the other hand, the routine shown in FIG. 14 is identical to that shown in FIG. 12, except that step 122 in FIG. 12 is replaced with step 122*b*. In step 122*b*, the air flow meter output voltage Vx, which corresponds to the air flow rate Gx calculated in step 120, is calculated from the function $f_F$. Then, the time constants τbx, τsx are calculated from the air flow meter output voltage Vx and the respective functions $f_C$, $f_D$.

Next, further alternative embodiment according to the present invention will be explained.

In the above-mentioned embodiment shown in FIG. 10, for example, the time constants $\tau b_j$, $\tau s_j$ are calculated from the respective air flow meter output voltages $v_j$. Therefore, if any one of the air flow meters $\mathbf{41}_j$ malfunctions, it is impossible to calculate the time constants $\tau b_j$, $\tau s_j$ of the air flow meter $\mathbf{41}_j$ in question and, accordingly, it is impossible to accurately calculate the air flow rate Gm.

In the present embodiment, it is judged whether the air flow meters $\mathbf{41}_j$ are malfunctioning. If a part of the air flow meters $\mathbf{41}_j$ malfunction, the air flow meter-detecting air flow rates $Gm_j$, assuming that air, of which flow rate is equal to G, flows through the intake divided-flow pipes $\mathbf{13}_j$ substantially uniformly, are estimated, and the total air flow meter-detecting air flow rate Gm is then estimated (Gm=$\Sigma Gm_j$).

Figure 15:
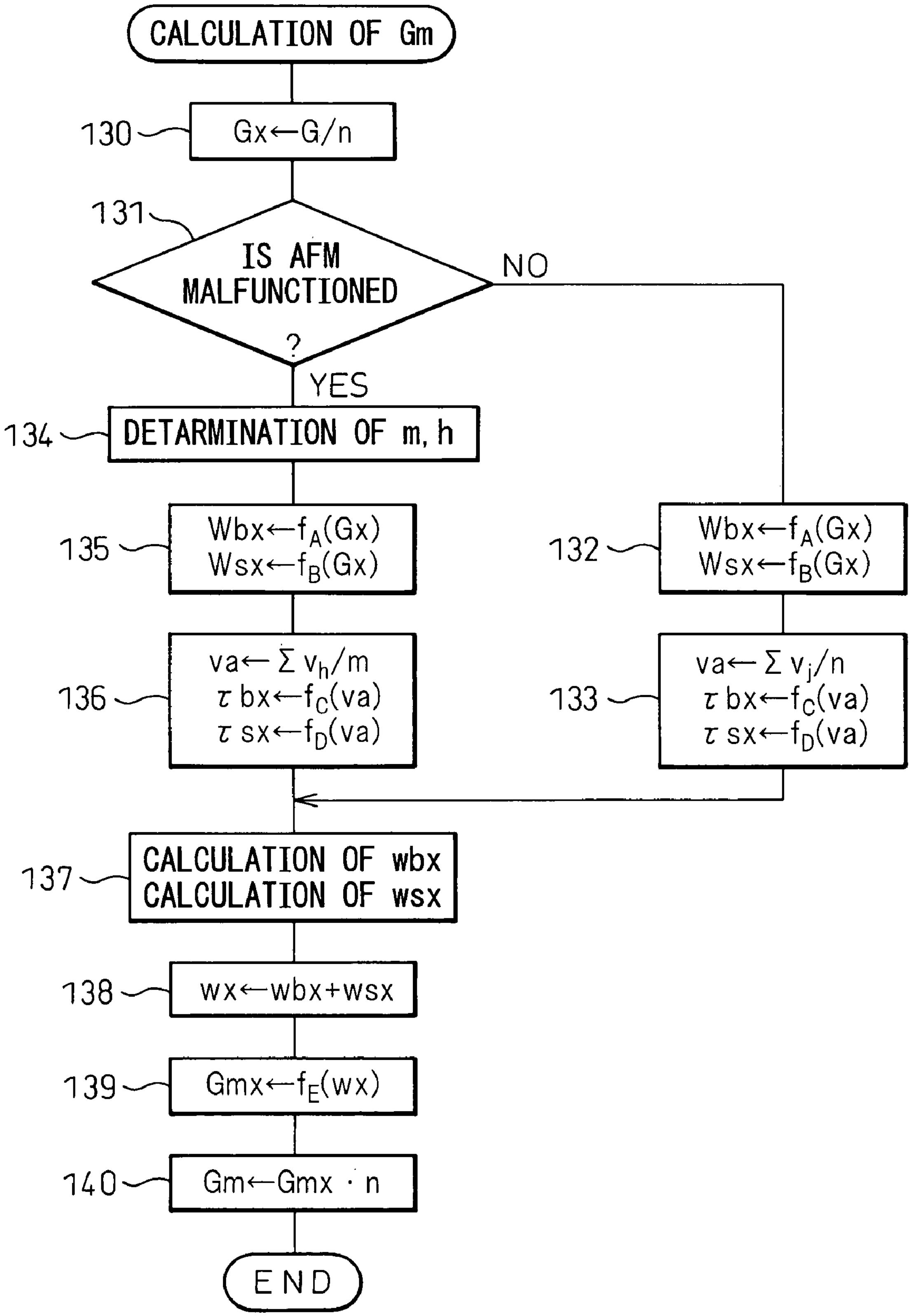

FIG. 15 shows a calculation routine of the air flow rate Gm according to the further alternative embodiment of the present invention. This routine is executed in step 101 shown in FIG. 9, as in the routine shown in FIG. 10.

Referring to FIG. 15, in step 130, the flow rate Gx of air flowing through each intake divided-flow pipe $\mathbf{13}_j$ (j=1, 2, . . . , n) is calculated from the equation (22). In the following step 131, it is judged whether any one of the air flow meters $\mathbf{41}_j$ has malfunctioned. For example, it is judged that the air flow meter $\mathbf{41}_j$ malfunctions when the output voltage $v_j$ of the air flow meter $\mathbf{41}_j$ in question is lower than a predetermined lower limit. When it is judged that none of the air flow meters $\mathbf{41}_j$ are malfunctioning, the routine goes to step 132, where the true heat radiation amounts Wbx, Wsx are calculated from the air flow rate Gx and the respective functions $f_A$, $f_B$. In the following step 133, an average va of the air flow meter output voltages $v_j$ is calculated (va=$\Sigma v_j$/n), and the time constants τbx, τsx are calculated from the average voltage va and the respective functions $f_C$, $f_D$. Then, the routine goes to step 137.

In contrast, when it is judged that at least one air flow meter 41$_j$ has malfunctioned, the routine goes to step 134, where parameters m, h are determined. Here, m represents the number of the air flow meters 41$_j$ which are not malfunctioning, and h represents the identifier j of the air flow meter 41$_j$ which has not malfunctioned (m, h=1, 2, . . . , n).

In the following step 135, the true heat radiation amounts Wbx, Wsx are calculated from the air flow rate Gx and the respective functions $f_A$, $f_B$. In the following step 136, an average va of the output voltages $v_h$ of the air flow meters 41$_h$ which have not malfunctioned, is calculated (va=$\Sigma v_h$/m), and the time constants τbx, τsx are calculated from the average voltage va and the respective functions $f_C$, $f_D$. Then, the routine goes to step 137.

In step 137, the response heat radiation amounts wbx, wsx are calculated from the respective equations (19), (20). In the following step 138, the total response heat radiation amount wx is calculated (wx=wbx+wsx). In the following step 139, the air flow meter-detecting air flow rate Gmx is calculated from the function $f_E$. In the following step 140, the total air flow meter-detecting air flow rate Gm is calculated (Gm=Gmx·n).

Note that when it is judged that a part of the air flow meters 41$_j$ have malfunctioned, the total air flow meter-detecting air flow rate mtafm (see FIG. 2) is calculated by the following equation (23):

$$mtafm = \frac{\sum mtafm_h}{m} \cdot n \tag{23}$$

where the first term of the right side represents the average of the air flow meter-detecting air flow rates mtafmh of the air flow meters 41$_h$ which have not malfunctioned, and n represents the number of the intake divided-flow pipes 13$_j$.

Figure 16:
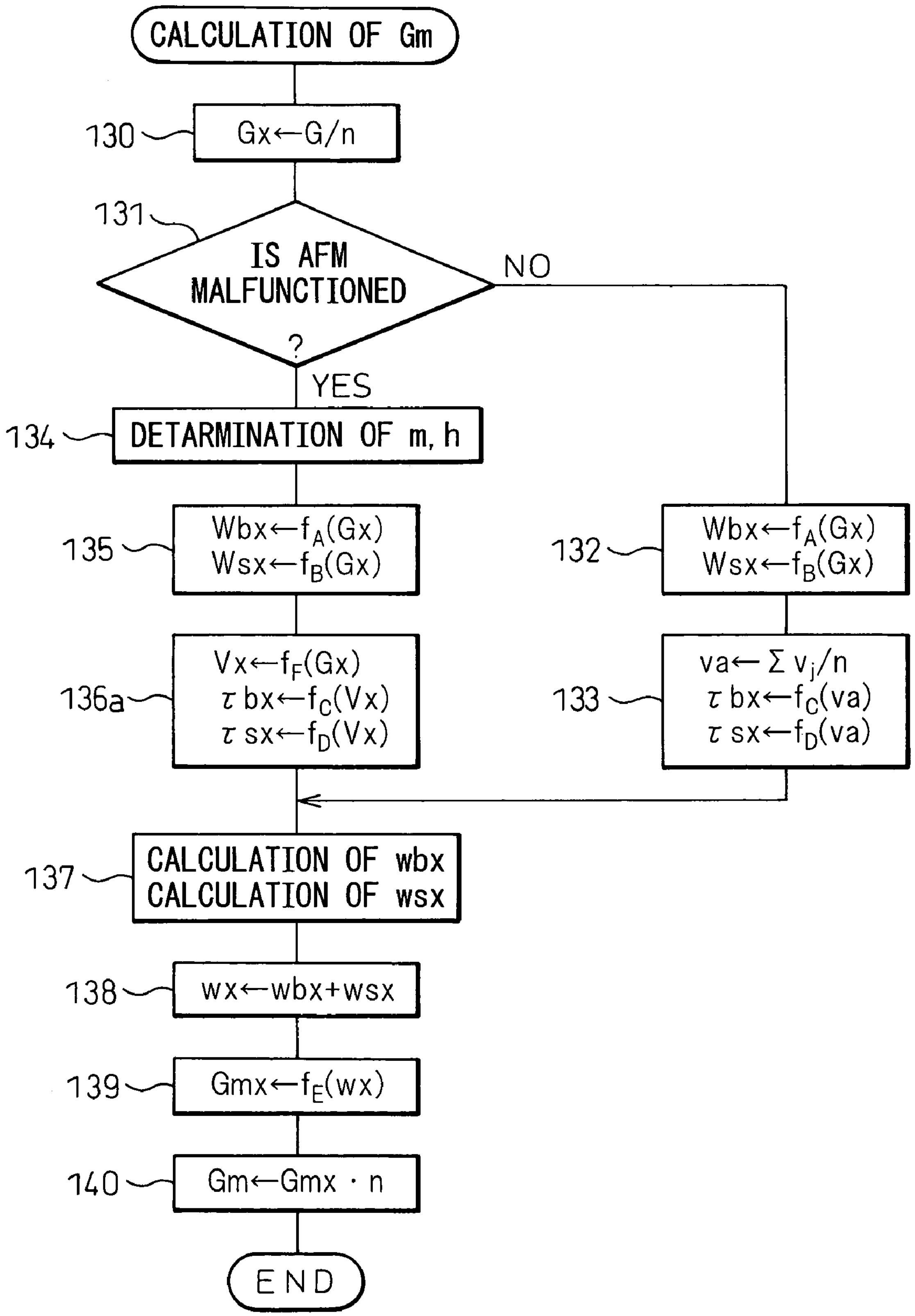

Alternatively, the routine shown in FIG. 15 may be changed as in FIG. 16. The routine shown in FIG. 16 is identical to that shown in FIG. 15, except that step 136 in FIG. 15 is replaced with step 136*a*.

In step 136*a*, the air flow meter output voltage Vx, which corresponds to the air flow rate Gx calculated in step 130, is calculated from the function $f_F$. Then, the time constants τbx, τsx are calculated from the air flow meter output voltage Vx and the respective functions $f_C$, $f_D$.

Note that steps 132, 133 in FIGS. 15 and 16 correspond to steps 121, 122 in FIG. 12, respectively. Therefore, steps 132, 133 may be changed as in FIG. 13 or 14.

Figure 17:
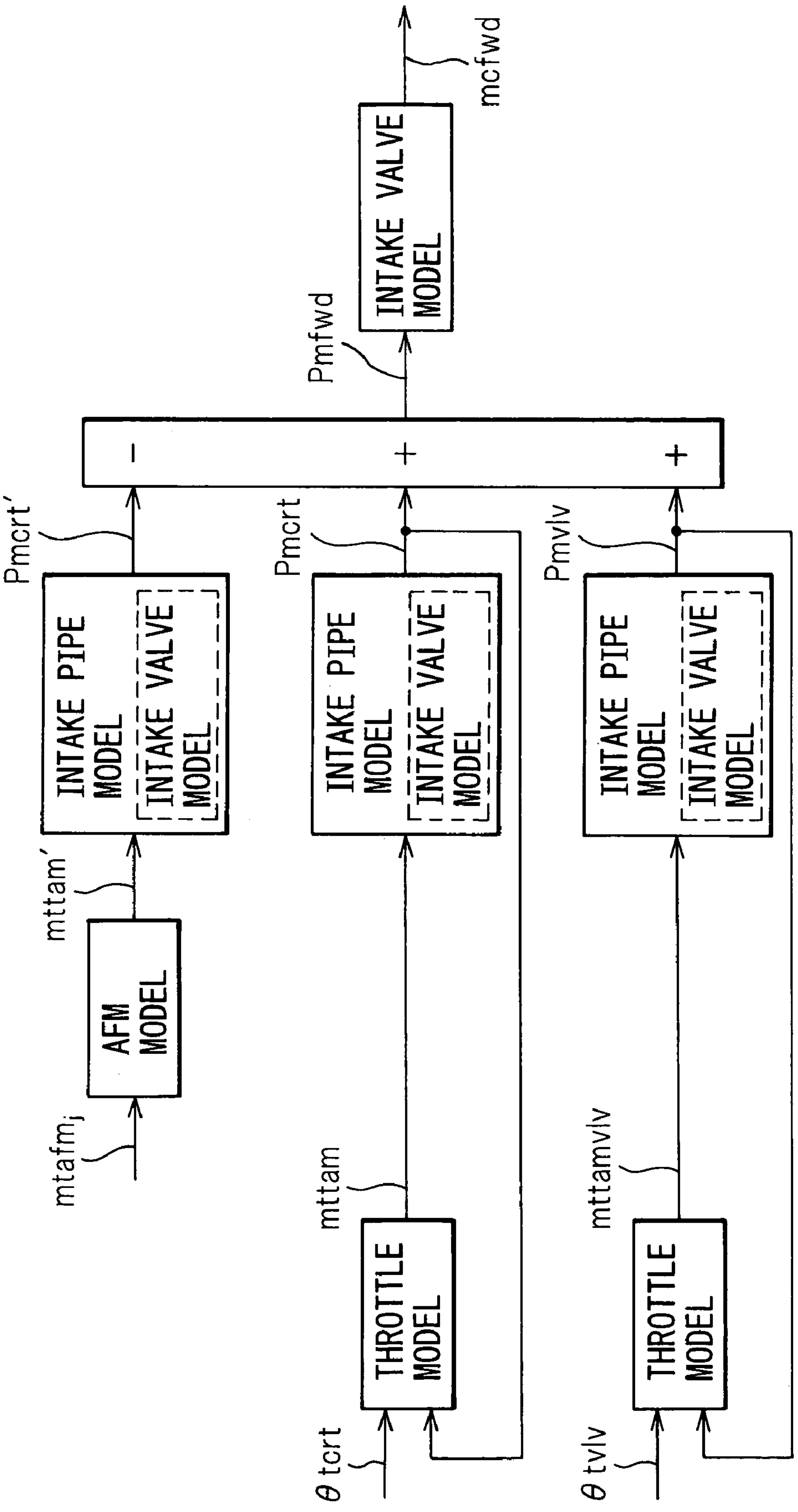
FIG. 17 shows a diagram for explaining an alternative embodiment of the present invention, in which a reverse model is used.

Next, referring to FIG. 17, a method of calculating the closing-timing intake pipe pressure Pmfwd using the reverse model will be explained. In this case, the closing-timing intake pipe pressure Pmfwd is calculated by the following equation (24):

$$Pmfwd = Pmvlv + (Pmcrt - Pmcrt') \tag{24}$$

where Pmvlv and Pmcrt are identical to those in the case where the forward model is used which is previously explained with reference to FIG. 2. Pmcrt' represents the current intake pipe pressure (kPa) calculated from an air flow rate mttam' (gram/sec).

In the case where the reverse model is used, the air flow meter-detecting air flow rate mttam' is first calculated from the air flow meter-detecting air flow rates $mtafm_j$ and the AFM model, and Pmcrt' is then calculated from mttam' and the intake pipe model.

The air flow meter-detecting air flow rates $mtafm_j$ correspond to the air flow rate Gm in FIG. 7, and the air flow meter-detecting air flow rate mttam' corresponds to the air flow rate G in FIG. 7. In other words, the air flow meter-detecting air flow rate mttam' includes no response lag and, therefore, the intake pipe pressure Pmcrt' also includes no response lag. On the other hand, the intake pipe pressure Pmcrt calculated from the air flow rate mttam also includes no response lag. Therefore, the response of Pmcrt' and Pmcrt are made identical. The difference between Pmcrt and Pmcrt' (=Pmcrt−Pmcrt') represents the errors of the calculation model. Accordingly, when the reverse model is used, the provisional closing-timing intake pipe pressure Pmvlv is corrected by the difference (Pmcrt−Pmcrt') to calculate the final closing-timing intake pipe pressure Pmfwd.

In the AFM model using the reverse model, the flow rate G of air flowing through the intake duct 13, assuming that the flow rates of air flowing through the respective intake divided-flow pipes 13$_j$ are equal to $Gm_j$, is estimated.

Specifically, first, the total response heat radiation amount $w_j$, assuming that the flow rates of air flowing through each intake divided-flow pipe 13$_j$ is equal to $Gm_j$, respectively, is calculated from the map shown in FIG. 8E or the function $f_E$. Then, the response heat radiation amounts $wb_j$, $ws_j$ of the bobbin 41*d* and the support bodies 41$_f$ are calculated. For example, $wb_j$, $ws_j$ can be calculated from the following equations (25) and (26), respectively:

$$wb_j = w_j \cdot kwb \tag{25}$$

$$ws_j = w_j \cdot kws \tag{26}$$

where kwb, kws represent predetermined coefficients (kwb, kws>0, kwb+kws=1).

Then, the time constants $\tau b_j$, $\tau s_j$ are calculated from the corresponding air flow meter output voltage $v_j$ and the maps shown in FIGS. 8C and 8D or the functions $f_C$ and $f_D$. Then, the true heat radiation amounts $Wb_j$, $Ws_j$, are calculated from the following equations (27) and (28), which can be obtained from the above-mentioned equations (19) and (20), respectively:

$$Wb_j(i) = wb_j(i) + \tau b_j \cdot \frac{wb_j(i) - wb_j(i-1)}{\Delta t} \tag{27}$$

$$Ws_j(i) = ws_j(i) + \tau s_j \cdot \frac{ws_j(i) - ws_j(i-1)}{\Delta t} \tag{28}$$

Figure 18:
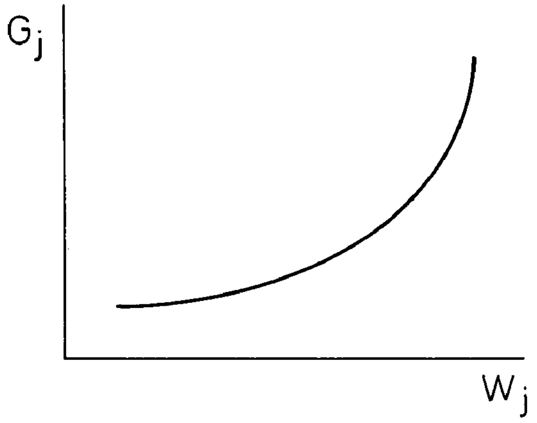
FIG. 18 shows a diagram illustrating an air flow rate $G_j$.

Then, each total true heat radiation amount $W_j$, which is a sum of the true heat radiation amounts $Wb_j$, $Ws_j$, is calculated ($W_j$=$Wb_j$+$Ws_j$). Then, each air flow rate $G_j$ is calculated. The relationships between the total true heat radiation amount $W_j$ and the air flow rate $G_j$ are obtained in advance in the form of a map shown in FIG. 18, and are stored in the ROM 32 in advance. Then, the total air flow rate G is calculated (G=$\Sigma G_j$). Note that the relationships between the total true heat radiation amount and the air flow rate shown in FIG. 18 is expressed as a function $f_G$.

Figure 19:
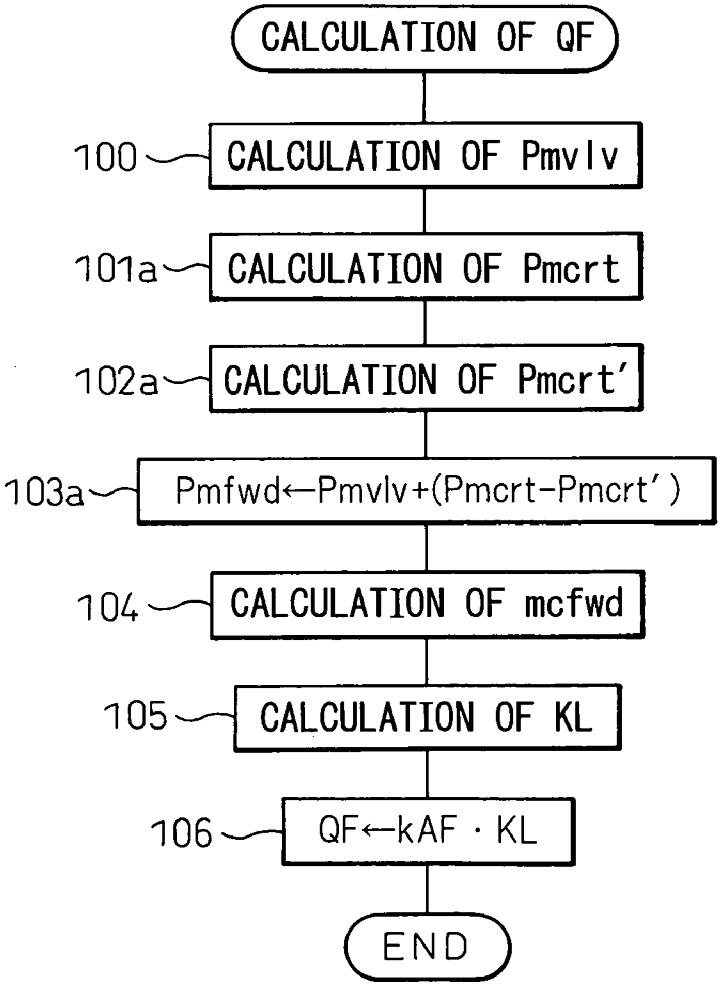
FIG. 19 shows a flowchart illustrating a routine for calculating a fuel injection amount QF, according to an alternative embodiment of the present invention.

FIG. 19 shows a calculation routine of the fuel injection amount QF in the case where the reverse model is used. This routine is identical to that shown in FIG. 9, except that steps 101, 102, and 103 in FIG. 9 are replaced with steps 101*a,* 102*a,* and 103*a,* respectively.

In step 101*a,* Pmcrt is calculated. In step 102*a,* Pmcrt' is calculated. In step 103*a,* the closing-timing intake pipe pressure Pmfwd is calculated from the equation (24).

Figure 20:
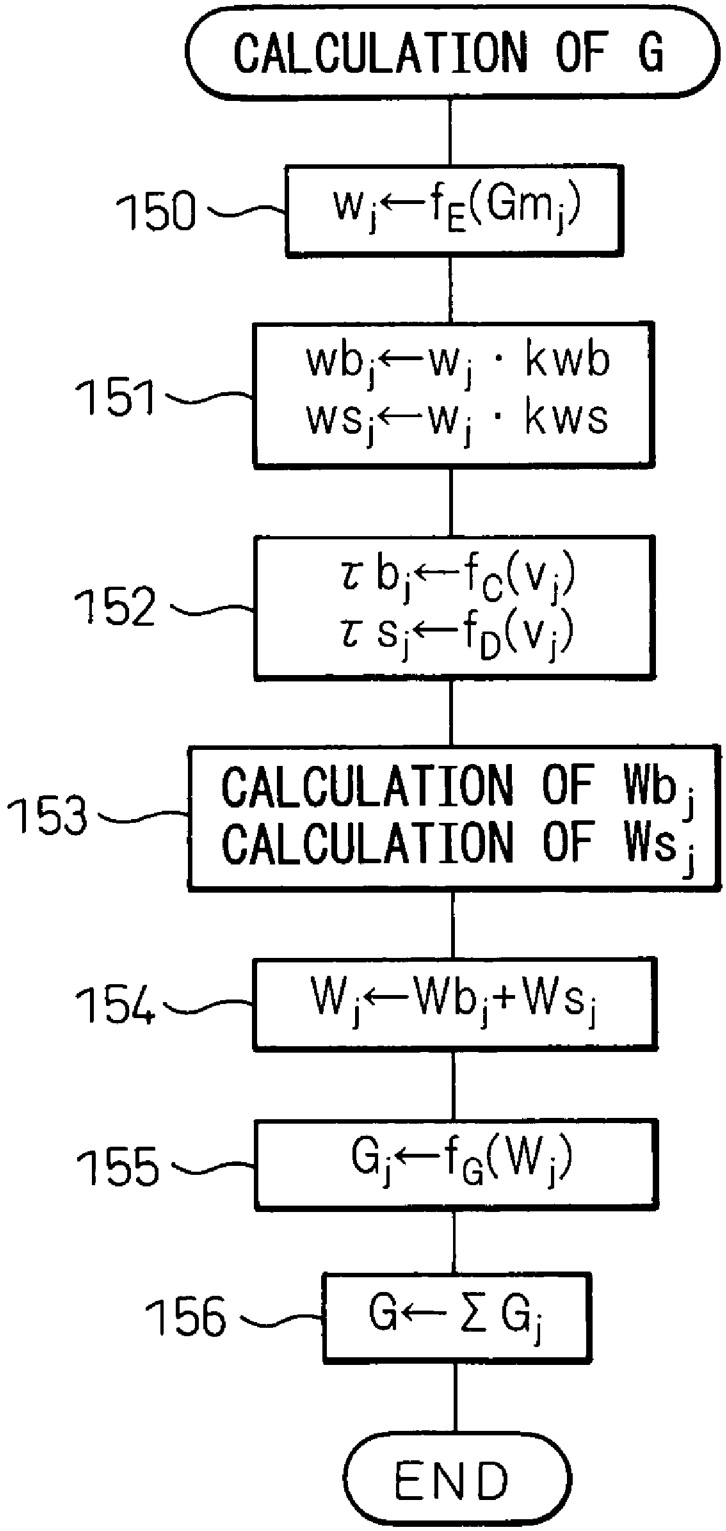
FIG. 20 shows a flowchart illustrating a routine for calculating an air flow rate Gm, according to an alternative embodiment of the present invention.

FIG. 20 shows a calculation routine of the air flow rate G in the case where the reverse model is used. This routine is executed in step 102*a* shown in FIG. 19.

Referring to FIG. 20, first, in step 150, the total response heat radiation amount $w_j$ of each air flow meter $\mathbf{41}_j$ (j=1, 2) is calculated. In the following step 151, the response heat radiation amounts $wb_j$, $ws_j$ are calculated, respectively. In the following step 152, the time constants $\tau b_j$, $\tau s_j$ are calculated, respectively. In the following step 153, the true heat radiation amounts $Wb_j$, $Ws_j$, are calculated from the equations (27) and (28), respectively. In the following step 154, each total true heat radiation amount $W_j$ is calculated. In the following step 155, each air flow rate $G_j$ is calculated from the corresponding total true heat radiation amount $W_j$ and the function $f_G$. In the following step 156, the total air flow rate G is calculated ($G=\Sigma G_j$). In step 102*a* in FIG. 19, $mtafm_j$ is substituted for $Gm_j$, and G calculated in step 156 in FIG. 20 is substituted for mttam'.

According to the present invention, it is possible to provide a control device for an internal combustion engine having a plurality of intake divided-flow conduits, capable of accurately obtaining the in-cylinder intake air amount at the closing timing of the intake valve, and of accurately conducting the engine control.

While the invention has been described by reference to specific embodiments chosen for purposes of illustration, it should be apparent that numerous modifications could be made thereto, by those skilled in the art, without departing from the basic concept and scope of the invention.

The invention claimed is:

1. A control device for an internal combustion engine having an intake passage and a throttle valve arranged in the intake passage, the intake passage upstream of the throttle valve being divided into a plurality of intake divided-flow conduits, the control device comprising:

air flow meters arranged in the respective intake divided-flow conduits;

obtaining means for obtaining the throttle opening;

calculation means for calculating a throttle valve passing-through air amount, which is an amount of air passing through the throttle valve, on the basis of the throttle opening obtained by the obtaining means;

estimating means for estimating each air flow meter-detecting intake air amount, which is an intake air amount to be detected by each air flow meter, assuming that air flows through each intake divided-flow conduit by a part of the throttle valve passing-through air amount calculated by the calculation means, the part being determined by a divided-flow ratio of the corresponding intake divided-flow conduit, and for estimating a total value of the estimated air flow meter-detecting intake air amounts; and control means for controlling the engine on the basis of the total air flow meter-detecting intake air amount estimated by the estimating means.

2. A control device for an internal combustion engine as described in claim 1, wherein each air flow meter is of a thermal type which detects an air amount on the basis of an amount of heat radiation to the air, and wherein the estimating means estimates the heat radiation amount of each air flow meter assuming that air flows through each intake divided-flow conduit by a part of the throttle valve passing-through air amount calculated by the calculation means, the part being determined by a divided-flow ratio of the corresponding intake divided-flow conduit, and estimates each air flow meter-detecting intake air amount from the corresponding, estimated heat radiation amount.

3. A control device for an internal combustion engine as described in claim 2, wherein the estimating means estimates the heat radiation amount of each air flow meter using a corresponding time constant, and each time constant is calculated from an output voltage of the corresponding air flow meter.

4. A control device for an internal combustion engine as described in claim 1, wherein an in-cylinder charged air amount, which is an amount of air having been charged into a cylinder when the intake stroke is completed, is estimated on the basis of the total air flow meter-detecting intake air amount estimated by the estimating means, and wherein the engine is controlled on the basis of the estimated in-cylinder charged air amount.

5. A control device for an internal combustion engine as described in claim 1, wherein an intake pipe pressure at the closing timing of an intake valve of the engine is estimated on the basis of the total air flow meter-detecting intake air amount estimated by the estimating means, the intake pipe pressure being a pressure in the intake passage downstream of the throttle valve, and wherein the engine is controlled on the basis of the estimated intake pipe pressure.

6. A control device for an internal combustion engine as described in claim 1, wherein:

each air flow meter detects a flow rate of air flowing through the corresponding intake divided-flow conduit;

the calculation means calculates a throttle valve passing-through air flow rate, which is a flow rate of air passing through the throttle valve, on the basis of the throttle opening obtained by the obtaining means;

the estimating means estimates each air flow meter-detecting air flow rate, which is a flow rate of air to be detected by the air flow meter, assuming that air flows through each intake divided-flow conduit by a part of the throttle valve passing-through air flow rate calculated by the calculation means, the part being determined by a divided-flow ratio of the corresponding intake divided-flow conduit, and estimates a total value of the estimated air flow meter-detecting air flow rates; and the control means controls the engine on the basis of the total air flow meter-detecting air amount estimated by the estimating means.

7. A control device for an internal combustion engine having an intake passage and a throttle valve arranged in the intake passage, the intake passage upstream of the throttle valve being divided into a plurality of intake divided-flow conduits, the control device comprising:

air flow meters arranged in the respective intake divided-flow conduits;

obtaining means for obtaining the throttle opening;

calculation means for calculating a throttle valve passing-through air amount, which is an amount of air passing through the throttle valve, on the basis of the throttle opening obtained by the obtaining means;

estimating means for estimating each air flow meter-detecting intake air amount, which is an intake air amount to be detected by the air flow meter, assuming that air, of which amount is equal to the throttle valve passing-through air amount calculated by the calculation means, flows through the intake divided-flow conduits substantially uniformly, and for estimating a total value of the estimated air flow meter-detecting intake air amounts; and control means for controlling the engine on the basis of the total air flow meter-detecting intake air amount estimated by the estimating means.

8. A control device for an internal combustion engine as described in claim 7, wherein each air flow meter is of a thermal type which detects an air amount on the basis of an amount of heat radiation to the air, and wherein the estimating means estimates the heat radiation amount of each air flow meter assuming that air, of which amount is equal to the throttle valve passing-through air amount calculated by the calculation means, flows through the intake divided-flow conduits substantially uniformly, and estimates each air flow meter-detecting intake air amount from the corresponding, estimated heat radiation amount.

9. A control device for an internal combustion engine as described in claim 8, wherein the estimating means estimates the heat radiation amount of each air flow meter using a corresponding time constant, and each time constant is calculated from an average of the output voltages of the air flow meters.

10. A control device for an internal combustion engine as described in claim 7, wherein an in-cylinder charged air amount, which is an amount of air having been charged into a cylinder when the intake stroke is completed, is estimated on the basis of the total air flow meter-detecting intake air amount estimated by the estimating means, and wherein the engine is controlled on the basis of the estimated in-cylinder charged air amount.

11. A control device for an internal combustion engine as described in claim 7, wherein an intake pipe pressure at the closing timing of an intake valve of the engine is estimated on the basis of the total air flow meter-detecting intake air amount estimated by the estimating means, the intake pipe pressure being a pressure in the intake passage downstream of the throttle valve, and wherein the engine is controlled on the basis of the estimated intake pipe pressure.

12. A control device for an internal combustion engine as described in claim 7, wherein:

each air flow meter detects a flow rate of air flowing through the corresponding intake divided-flow conduit;

the calculation means calculates a throttle valve passing-through air flow rate, which is a flow rate of air passing through the throttle valve, on the basis of the throttle opening obtained by the obtaining means;

the estimating means estimates each air flow meter-detecting air flow rate, which is a flow rate of air to be detected by the air flow meter, assuming that air, of which flow rate is equal to the throttle valve passing-through air flow rate calculated by the calculation means, flows through the intake divided-flow conduits substantially uniformly, and estimates a total value of the estimated air flow meter-detecting air flow rates; and the control means controls the engine on the basis of the total air flow meter-detecting air flow rate estimated by the estimating means.

13. A control device for an internal combustion engine having an intake passage and a throttle valve arranged in the intake passage, the intake passage upstream of the throttle valve being divided into a plurality of intake divided-flow conduits, the control device comprising:

air flow meters arranged in the respective intake divided-flow conduits;

obtaining means for obtaining the throttle opening;

calculation means for calculating a throttle valve passing-through air amount, which is an amount of air passing through the throttle valve, on the basis of the throttle opening obtained by the obtaining means;

judging means for judging whether the air flow meters have malfunctioned;

estimating means for estimating each air flow meter-detecting intake air amount, which is an intake air amount to be detected by the air flow meter, assuming that air, of which amount is equal to the throttle valve passing-through air amount calculated by the calculation means, flows through the intake divided-flow conduits substantially uniformly, and for estimating a total value of the estimated air flow meter-detecting intake air amounts, when it is judged that a part of the air flow meters have malfunctioned; and control means for controlling the engine on the basis of the total air flow meter-detecting intake air amount estimated by the estimating means.

14. A control device for an internal combustion engine as described in claim 13, wherein each air flow meter is of a thermal type which detects an air amount on the basis of an amount of heat radiation to the air, and wherein the estimating means estimates the heat radiation amount of each air flow meter assuming that air, of which amount is equal to the throttle valve passing-through air amount calculated by the calculation means, flows through the intake divided-flow conduits substantially uniformly, and estimates each air flow meter-detecting intake air amount from the corresponding, estimated heat radiation amount.

15. A control device for an internal combustion engine as described in claim 13, wherein an in-cylinder charged air amount, which is an amount of air having been charged into a cylinder when the intake stroke is completed, is estimated on the basis of the total air flow meter-detecting intake air amount estimated by the estimating means, and wherein the engine is controlled on the basis of the estimated in-cylinder charged air amount.

16. A control device for an internal combustion engine as described in claim 13, wherein an intake pipe pressure at the closing timing of an intake valve of the engine is estimated on the basis of the total air flow meter-detecting intake air amount estimated by the estimating means, the intake pipe pressure being a pressure in the intake passage downstream of the throttle valve, and wherein the engine is controlled on the basis of the estimated intake pipe pressure.

17. A control device for an internal combustion engine as described in claim 13, wherein:

each air flow meter detects a flow rate of air flowing through the corresponding intake divided-flow conduit;

the calculation means calculates a throttle valve passing-through air flow rate, which is a flow rate of air passing through the throttle valve, on the basis of the throttle opening obtained by the obtaining means;

the estimating means estimates each air flow meter-detecting air flow rate, which is a flow rate of air to be detected by the air flow meter, assuming that air, of which flow rate is equal to the throttle valve passing-through air flow rate calculated by the calculation means, flows through the intake divided-flow conduits substantially uniformly, and estimates a total value of the estimated air flow meter-detecting air flow rates, when it is judged that a part of the air flow meters have malfunctioned; and the control means controls the engine on the basis of the total air flow meter-detecting air flow rate estimated by the estimating means.

18. A control device for an internal combustion engine having an intake passage and a throttle valve arranged in the intake passage, the intake passage upstream of the throttle valve being divided into a plurality of intake divided-flow conduits, the control device comprising:

air flow meters arranged in the respective intake divided-flow conduits;

estimating means for estimating an amount of air flowing through each intake divided-flow conduit on the basis of a corresponding air flow meter-detecting intake air amount which is an intake air amount to be detected by the air flow meter, and for estimating a throttle valve passing-through air amount, which is an amount of air passing through the throttle valve, from a total value of the estimated amounts of air flowing through the intake divided-flow conduits; and control means for controlling the engine on the basis of the throttle valve passing-through air amount estimated by the estimating means.

19. A control device for an internal combustion engine as described in claim 18, wherein each air flow meter is of a thermal type which detects an air amount on the basis of an amount of heat radiation to the air, and wherein the heat radiation amount of each air flow meter is estimated and the amount of air flowing through each intake divided-flow conduit is estimated from the corresponding estimated heat radiation amount.

20. A control device for an internal combustion engine as described in claim 18, wherein an in-cylinder charged air amount, which is an amount of air having been charged into a cylinder when the intake stroke is completed, is estimated on the basis of the throttle valve passing-through air amount estimated by the estimating means, and wherein the engine is controlled on the basis of the estimated in-cylinder charged air amount.

21. A control device for an internal combustion engine as described in claim 18, wherein an intake pipe pressure at the closing timing of an intake valve of the engine is estimated on the basis of the throttle valve passing-through air amount estimated by the estimating means, the intake pipe pressure being a pressure in the intake passage downstream of the throttle valve, and wherein the engine is controlled on the basis of the estimated intake pipe pressure.

22. A control device for an internal combustion engine as described in claim 18, wherein:

each air flow meter detects a flow rate of air flowing through the corresponding intake divided-flow conduit;

the estimating means estimates a flow rate of air flowing through each intake divided-flow conduit on the basis of a corresponding air flow meter-detecting air flow rate which is the air flow rate to be detected by the air flow meter, and estimates a throttle valve passing-through air flow rate, which is a flow rate of air passing through the throttle valve, on the basis of a total value of the estimated air flow rates; and the control means controls the engine on the basis of the throttle valve passing-through air flow rate estimated by the estimating means.

* * * * *